(12) United States Patent
Bennis

(10) Patent No.: US 12,453,340 B2
(45) Date of Patent: Oct. 28, 2025

(54) METHOD OF ASSEMBLY OF COMBINED FIXED AND SLIP BOBBER

(71) Applicant: Gary Bennis, Eau Claire, WI (US)

(72) Inventor: Gary Bennis, Eau Claire, WI (US)

(73) Assignee: Gary Bennis, Eau Claire, WI (US)

( * ) Notice: Subject to any disclaimer, the term of this patent is extended or adjusted under 35 U.S.C. 154(b) by 0 days.

(21) Appl. No.: 18/503,017

(22) Filed: Nov. 6, 2023

(65) Prior Publication Data

US 2024/0138390 A1   May 2, 2024

Related U.S. Application Data

(63) Continuation of application No. 16/362,507, filed on Mar. 22, 2019, now abandoned.

(60) Provisional application No. 62/713,438, filed on Aug. 1, 2018, provisional application No. 62/646,878, filed on Mar. 22, 2018.

(51) Int. Cl.
*A01K 91/04*   (2006.01)

(52) U.S. Cl.
CPC .................... *A01K 91/04* (2013.01)

(58) Field of Classification Search
CPC .................. A01K 93/00; A01K 99/00
USPC ........... 43/44.87, 44.91, 44.93, 44.94, 44.95, 43/43.144, 9
See application file for complete search history.

(56) References Cited

U.S. PATENT DOCUMENTS

| | | | | |
|---|---|---|---|---|
| 2,863,254 A * | 12/1958 | Kercher, Sr. | ........... | A01K 93/00 43/44.94 |
| 2,958,153 A * | 11/1960 | Yerman | .................. | A01K 95/00 43/43.14 |
| 3,131,957 A * | 5/1964 | Musto | .................... | A01K 91/04 289/17 |
| 3,798,825 A * | 3/1974 | Popeil | .................... | A01K 93/00 43/44.9 |
| 4,177,598 A * | 12/1979 | Jolley | .................... | A01K 91/04 43/42.49 |
| 5,329,722 A * | 7/1994 | Wilson | .................. | A01K 93/00 43/44.87 |
| 5,784,829 A * | 7/1998 | Latta | ...................... | A01K 93/00 43/44.87 |
| 6,009,659 A * | 1/2000 | Shannon | ................ | A01K 93/00 43/44.87 |
| 6,094,853 A * | 8/2000 | Lim | ........................ | A01K 85/02 43/43.11 |
| 6,655,073 B2 * | 12/2003 | Mosher | .................. | A01K 95/00 43/43.1 |
| 6,880,288 B1 * | 4/2005 | Hanes | .................... | A01K 93/00 43/44.87 |
| 7,797,877 B1 * | 9/2010 | Bennis | .................. | A01K 91/03 43/44.87 |
| 2002/0178645 A1 * | 12/2002 | Adams | .................. | A01K 93/02 43/43.14 |
| 2005/0028426 A1 * | 2/2005 | Blette | .................. | A01K 91/047 43/43.1 |
| 2006/0042147 A1 * | 3/2006 | Jenkins | ................. | A01K 85/16 43/42.36 |
| 2009/0077858 A1 * | 3/2009 | Wright | .................. | A01K 93/02 43/41.2 |

(Continued)

*Primary Examiner* — Zoe Tam Tran

(74) *Attorney, Agent, or Firm* — William D. Hare, Esq.; McNeely, Hare & War, LLP

(57) ABSTRACT

The invention is directed to a method of making a stem of a fishing float. The method includes a first step of using injection molding to form a first stem part, a second step of using injection molding to form a second stem part, and a third step of mounting the first stem part to the second stem part.

14 Claims, 17 Drawing Sheets

(56) References Cited

U.S. PATENT DOCUMENTS

| | | | | |
|---|---|---|---|---|
| 2009/0133312 A1* | 5/2009 | Bennis | .................. | A01K 91/03 43/4.5 |
| 2010/0101137 A1* | 4/2010 | MacDonald | ........... | A01K 85/00 43/44.9 |
| 2010/0281757 A1* | 11/2010 | Bennis | .................. | A01K 93/00 43/44.9 |
| 2012/0030991 A1* | 2/2012 | Chatfield | ............... | A01K 85/00 43/42.49 |
| 2012/0246996 A1* | 10/2012 | Bennis | .................. | A01K 93/02 43/17 |
| 2014/0033599 A1* | 2/2014 | Bennis | .................. | A01K 91/03 43/44.87 |
| 2014/0259865 A1* | 9/2014 | Kavanaugh | ............ | A01K 91/03 43/17 |

\* cited by examiner

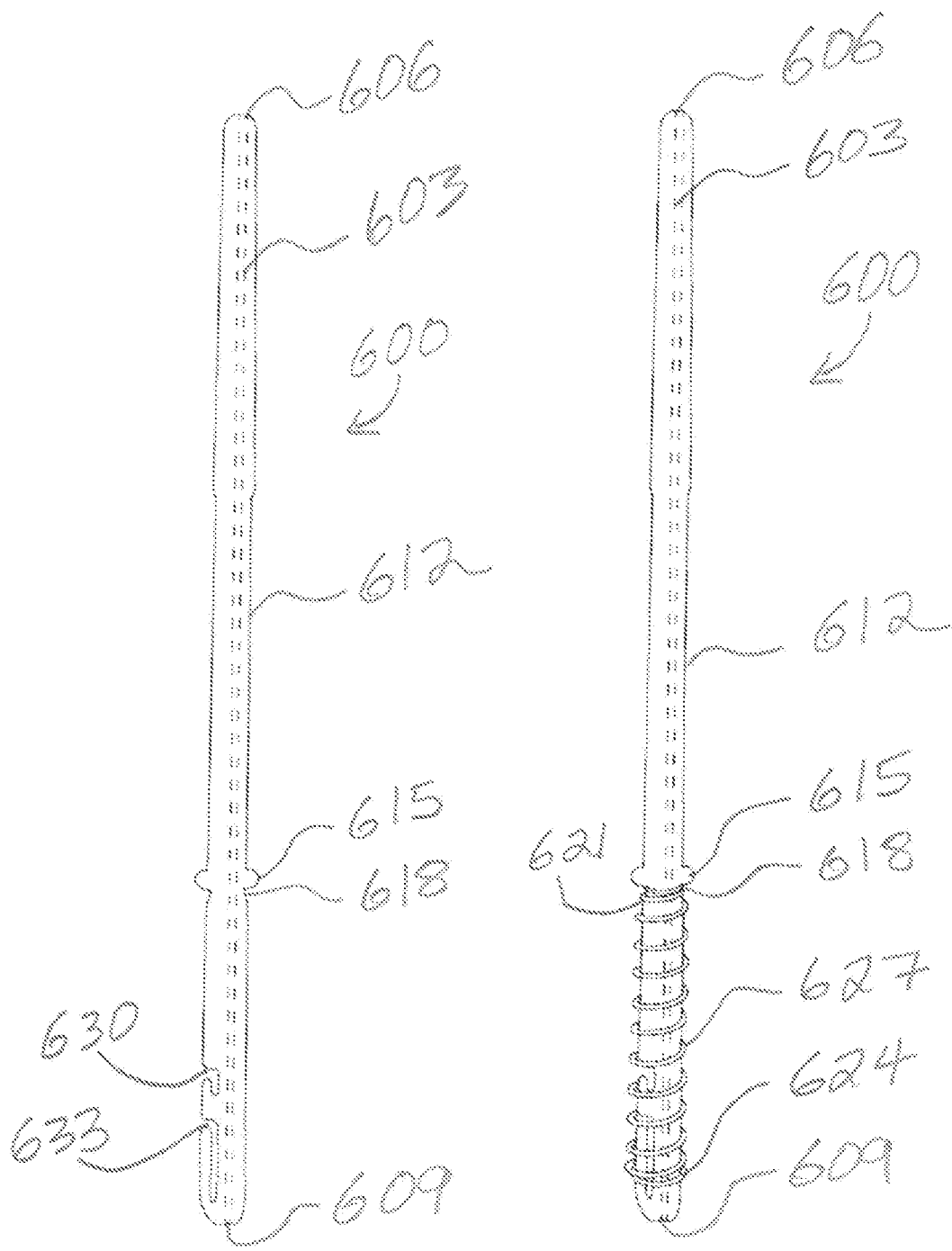

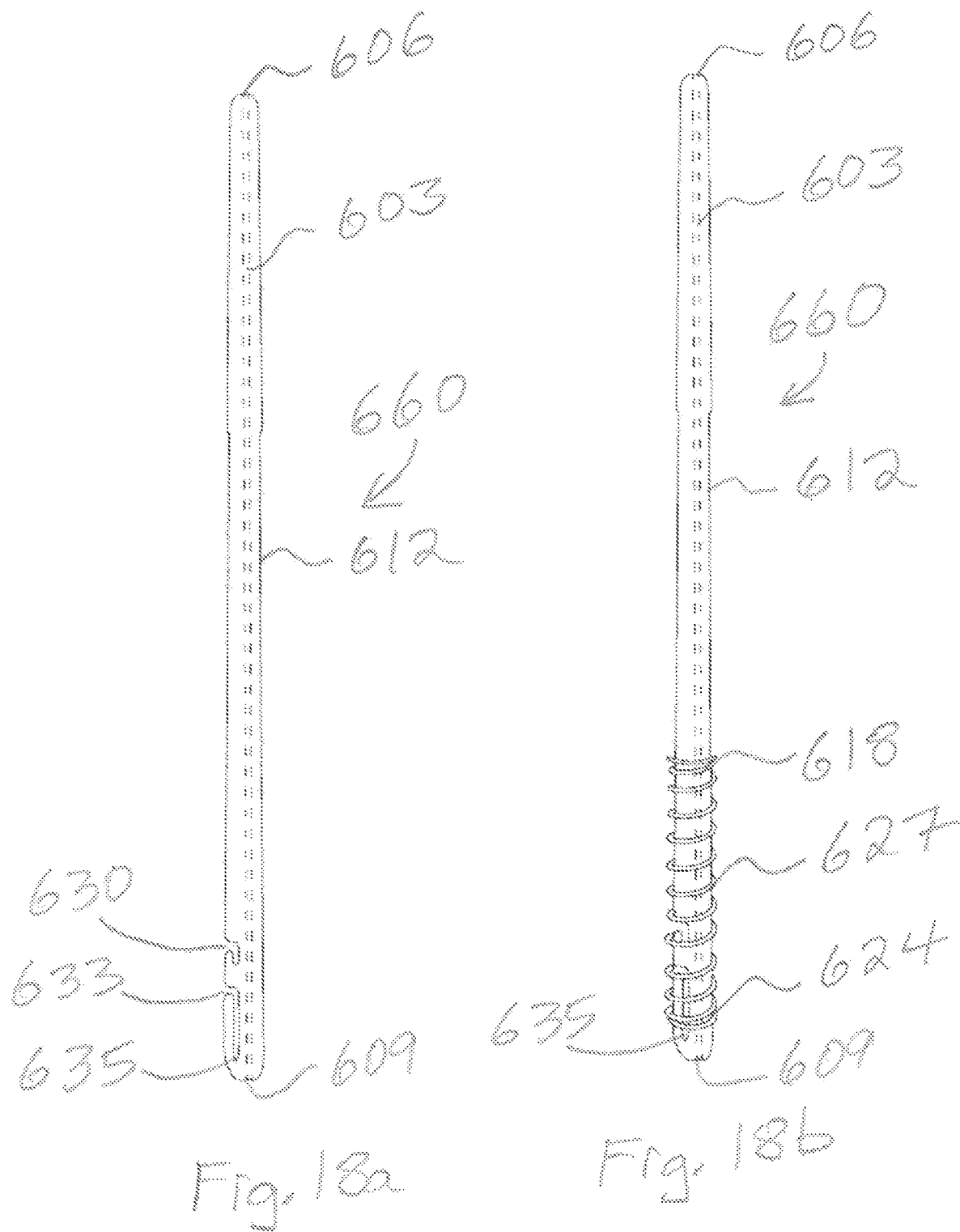

METHOD OF ASSEMBLY OF COMBINED FIXED AND SLIP BOBBER

CROSS REFERENCE TO RELATED APPLICATIONS

This is a non-provisional application that claims priority as a divisional application of U.S. application Ser. No. 16/362,507, filed on Mar. 22, 2019, claiming the benefit of priority of provisional patent application No. 62/646,878 filed on Mar. 22, 2018 and 62/713,438 filed on Aug. 1, 2018.

FIELD OF THE INVENTION

This invention relates generally to a combined fixed and slip bobber that is configured to be easily assembled.

BACKGROUND OF THE INVENTION

The concept of fishing tackle such as fishing bobbers that can be used either as a slip bobber or a fixed line bobber is known in the art. Typically, in the slip bobber mode the fishing line extends freely through a tube in the fishing float. A string stop in the form of a knot is tied onto the fishing line. Usually a bead, which can slide along the fishing line, is placed on the fishing line with the knot forming a stop for the bead and the bead having a larger outside diameter than the tube to form a stop for the fishing bobber. The knot being small can pass through the eyes of the fishing rod and the fishing reel to allow the line with the knot to be wound up on the fishing reel. As one casts the line with the slip bobber and the bead the hook with the bait sinks allowing the fishing line to slide through the slip bobber until the bead engages the knot, which prevents further sliding of the bead along the fishing line. In addition, since the bead cannot pass through the tube in the fishing float it also stops the fishing float from sliding past the knot thus limiting the depth of the hook.

U.S. Pat. No. 6,158,164 to Mack et al. discloses a fixed fishing bobber that is formed by mounting a top half of a bobber to a lower half of a bobber. The bottom half of the bobber includes an attachment devices, such as a J-hook for mounting the fishing line to the bobber. The interior of the bobber includes metal weights. The '164 Patent does not disclose the bobber configured for use as a slip bobber in which the fishing line passes through the length of the bobber.

U.S. Pat. No. 4,893,433 to Scheffler et al. discloses a two part slip bobber that mate together to form a buoyant body in which one of the halves includes a groove on the mating surface to form a channel for slidable reception of a fishing line. As disclosed in the '433 Patent, the groove passes across the surface of the first half and through a threaded post extending from the first half to be received by the second, opposite half when the two halves are mated. The channel is formed by the groove in the first half and the wall of the second half upon mating the second half to the first half.

U.S. Pat. No. 4,616,441 to Dmytriw discloses bobbers made from two body members that are pressed together to form a watertight seal and in so doing secure the fishing line to the bobber. Other patents disclosing bobbers made from two body members include U.S. Pat. No. 4,563,831 to Gibney, U.S. Pat. No. 3,241,262 to Beverly, and U.S. Pat. No. 2,881,552 to Miller.

SUMMARY OF THE INVENTION

In one general aspect there is provided a method of making a stem of a fishing float. The method includes:

using injection molding to form a first stem part having a semicircular cross section of a radius of about 2.2 mm or greater and a length between 4 cm and 15 cm, using injection molding to form a second stem part having a semicircular cross section of a radius of about 2.2 mm or greater and a length between 4 cm and 15 cm, and mounting the first stem part and the second stem part to form a stem.

The first stem part includes a wall having an outer surface and an inner surface and a wall surface connecting the outer surface to the inner surface with a thickness of the wall defined as a distance from the outer surface to the inner surface and being between 0.5 mm and 1 mm, a first slot passing from the outside surface of the wall into the wall without passing to the inner surface of the wall, a second slot passing from the outside surface of the wall into the wall without passing to the inner surface of the wall, wherein the second slot passes from the outer surface of the wall into the wall at a different position along the length of the first stem part than the first slot, and further comprising a member extending outwardly from the outer surface.

The second stem part includes a wall having an outer surface and an inner surface with a thickness of the wall defined as a distance from the outer surface to the inner surface and being between 0.5 mm and 1 mm, a first slot passing from the outside surface of the wall into the wall without passing to the inner surface of the wall, a second slot passing from the outside surface of the wall into the wall without passing to the inner surface of the wall, wherein the second slot passes from the outer surface of the wall into the wall at a different position along the length of the second stem part than the first slot, and further comprising a member extending outwardly from the outer surface.

The step of mounting the first stem part and the second stem part to form a stem results in the first slot on the first stem part aligning with the first slot on the second stem part, the second slot on the first stem part aligning with the second slot on the second stem part, and the semicircular cross section of the first stem part and the semicircular cross section of the second stem part being aligned to form a channel along the length of the stem with openings at opposite end of the stem.

Embodiments of the method may include one or more of the following features. For example, the radius of the cross-section of the first stem part and/or the second stem part may be between about 2.2 mm and about 5 mm, between about 2.2 mm and about 4.5 mm, between about 2.2 mm and about 4.0 mm, or between about 2.2 mm and about 3.5 mm. In another embodiment, the radius is about 2.3 mm, about 2.4 mm, about 2.5 mm, about 2.6 mm, about 2.7 mm, about 2.8 mm, or about 2.9 mm.

The channel formed may have an inner diameter between about 1.0 mm to about 3.2 mm, between about 1.0 mm to about 3.0 mm, between about 1.0 mm to about 2.5 mm, between about 1.0 mm to about 2.0 mm. More specifically, the inner diameter may be about 1.1 mm, about 1.2 mm, about 1.3 mm, about 1.4 mm, about 1.5 mm, about 1.6 mm, about 1.7 mm, about 1.8 mm, about 1.9 mm.

Mounting the first stem part and the second stem part to form the stem may align the member extending outwardly from the outer surface of the first stem part to align with the member extending outwardly from the outer surface of the second stem part.

The wall surface of the first stem part may include one or more of pegs extending from the wall surface or openings extending into the wall surface, and the wall surface of the second stem part includes one or more of pegs extending from the wall surface or openings extending into the wall surface and mounting the first stem part and the second stem part to form a stem comprises the one or more pegs aligning and fitting into the one or more openings.

The method may further include applying a coating to the stem. The method may further include mounting a buoyant member to the stem. The buoyant member may have a channel therethrough and mounting the buoyant member to the stem comprises inserting the stem into the channel.

The method may further comprise mounting a buoyant member to the stem. The buoyant member may have a channel therethrough and mounting the buoyant member to the stem includes inserting the stem into the channel. The method may include applying an adhesive to the buoyant member or stem to adhere the buoyant member to the stem. The method may further include applying a coating to the buoyant member and stem.

The method may further include mounting a spring to the stem.

Embodiments of the method may include one or more of the following features or those described above. For example, the joining technique may include ultrasonic welding. The joining may include application of an adhesive. The joining technique may form a water-tight cavity.

In another embodiment, the invention relates to a method of making a stem of a fishing float. The method includes a first step of using injection molding to form a first stem part, a second step of using injection molding to form a second stem part, and a third step of mounting the first stem part to the second stem part.

The first stem part has a cross section of a diameter of about 4.75 mm or greater and a length of between about 50 mm and about 70 mm, has a wall having an outer surface and an inner surface and a wall surface connecting the outer surface to the inner surface with a thickness of the wall defined as a distance from the outer surface to the inner surface, and a first slot passing from the outside surface of the wall into the wall without passing to the inner surface of the wall.

The second stem part has a cross section of a diameter of about 4.75 mm or greater and a length between 40 mm and 70 mm, a wall having an outer surface and an inner surface and a wall surface connecting the outer surface to the inner surface with a thickness of the wall defined as a distance from the outer surface to the inner surface. The second stem part includes a channel passing between an opening at a first end and an opening at a second end. The second stem part further includes a tubular member extending outwardly from the first end and has an outer diameter less than the outer diameter of the second stem part and approximately the same as the diameter of the channel in the first stem part.

The step of mounting the first and second stem parts includes a step of inserting the tubular member of the second stem part into the opening into the channel at the second end of the first stem part to form a stem such that the channel in the first stem part and the channel in the second stem part align with a common longitudinal axis and a joint is formed at the intersection of the first stem part and the second stem part.

Embodiments of the method may include one or more of the following features. For example, the channel in the first stem part may have a diameter of between about 1.0 mm and about 3.00 mm, between about 1.0 mm and about 2.5 mm, between about 1.0 mm and about 2.0 mm, between about 1.0 mm and about 1.5 mm, about 1.1 mm, about 1.2 mm, about 1.3 mm, about 1.4 mm. The channel in the second stem part may have a diameter of between about 1.0 mm and about 3.00 mm, between about 1.0 mm and about 2.5 mm, between about 1.0 mm and about 2.0 mm, between about 1.0 mm and about 1.5 mm, about 1.1 mm, about 1.2 mm, about 1.3 mm, about 1.4 mm.

The outer diameter of the first stem part and/or the second stem part may be between about 4.4 mm and about 10 mm, less than about 9 mm, less than about 8.5 mm, less than about 8.0 mm, less than about 7.6 mm, less than about 7.5 mm, less than about 7.4 mm, less than about 7.3 mm, less than about 7.2 mm, less than about 7.1 mm, less than about 7.0 mm, less than about 6.9 mm, less than about 6.8 mm, less than about 6.7 mm, less than about 6.6 mm, less than about 6.5 mm, less than about 6.4 mm, less than about 6.3 mm, less than about 6.2 mm, less than about 6.1 mm, less than about 6.0 mm, less than about 5.9 mm, less than about 5.8 mm, less than about 5.7 mm, less than about 5.6 mm, less than about 5.5 mm, less than about 5.4 mm, less than about 5.3 mm.

The first stem part may further include a second slot passing from the outside surface of the wall into the wall without passing to the inner surface of the wall. The second slot may pass from the outer surface of the wall into the wall at a different position along the length of the first stem part than the first slot.

The first stem part may further include a member extending outwardly from the outer surface.

The method may further include mounting a buoyant member to the stem. The buoyant member may have a channel therethrough and mounting the buoyant member to the stem includes inserting the stem into the channel such that the float member surrounds the joint.

The first stem part and the second stem part are joined without the use of an adhesive between the tubular member and the opening into the channel in the first stem part.

The method may further include using injection molding to form a cap part having a circular cross section of a diameter greater than about 4.4 mm and a length between 10 mm and 40 mm, a wall having an outer surface and an inner surface and a wall surface connecting the outer surface to the inner surface with a thickness of the wall defined as a distance from the outer surface to the inner surface and being between 0.5 mm and 1.5 mm, a channel having an opening at a first end and having a diameter of between 1.0 mm and 3.00 mm. The cap may further include a tubular member extending outwardly from the first end and having an outer diameter less than the outer diameter of the cap part and approximately the same as the diameter of the channel in the second stem part.

Next the tubular member of the cap part is inserted into the opening into the channel at the second end of the second stem part such that the channel in the cap part and the channel in the second stem part align with a common longitudinal axis and a joint is formed at the intersection of the cap part and the second stem part.

The cap part and the second stem part are joined without the use of an adhesive between the tubular member and the opening into the channel in the second stem part.

The method further includes mounting a spring to the stem.

BRIEF DESCRIPTION OF THE DRAWINGS

FIGS. 1l a-b are front views of unassembled opposite parts that form the stem of a second embodiment of a fixed and slip bobber.

FIGS. 15a-b are front views of an assembled fishing float stem that includes a flange and a narrowed region for retaining a spring.

FIGS. 18a-b are front views of an assembled fishing float stem that is without a flange, bulbous end or narrowed region.

DESCRIPTION OF THE PREFERRED EMBODIMENTS

Figure 1B:
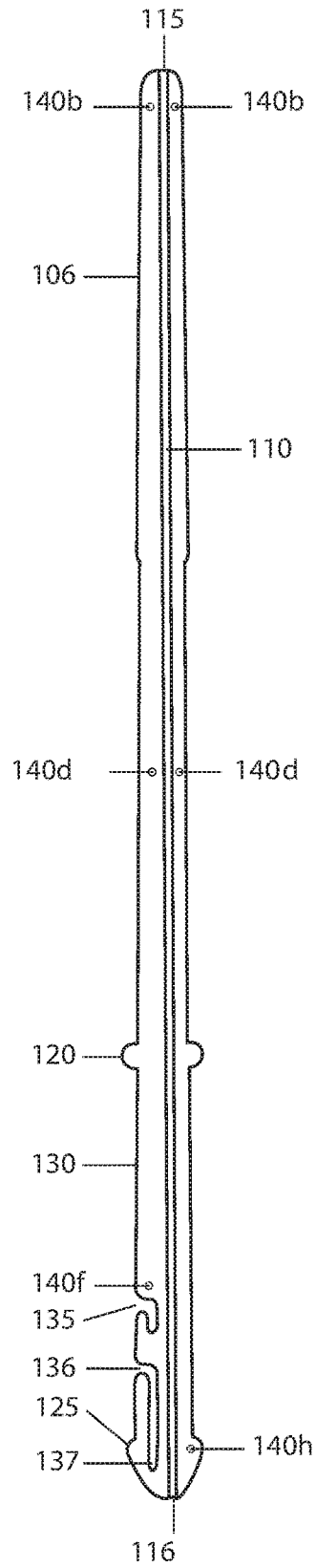
FIGS. 1A and 1B are side views of unassembled opposite halves that form the stem of a first embodiment of a fixed and slip bobber.
Figure 1A:
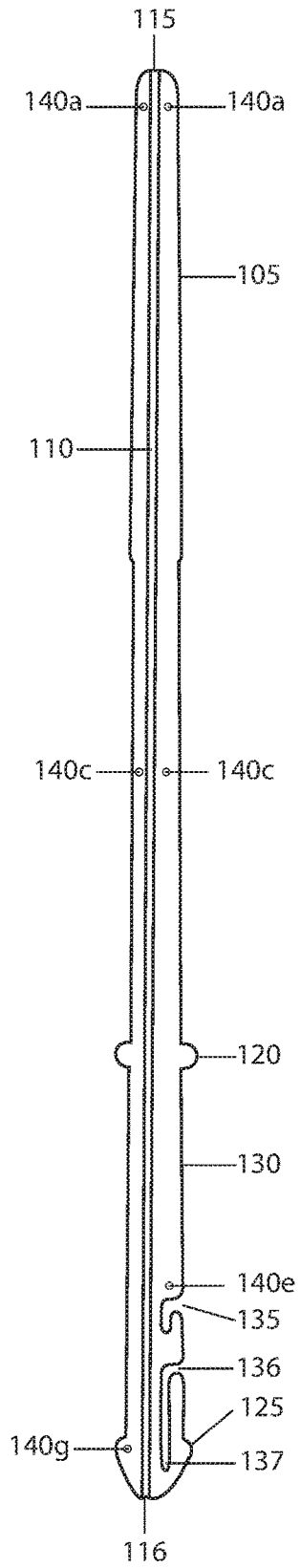

Referring to FIGS. 1A and 1B a fishing float stem 100 is made of two mating pieces 105, 106 that are joined to form an axial channel 110 that passes between two open ends 115, 116. Each mating piece 105, 106 includes a semicircular flange 120 that will form a complete flange around the outside circumference of the assembled stem 100 when mating pieces 105, 106 are joined. The end 116 includes a bulbous region 125 that extends beyond the outer surface of the stem. Thus, when mating pieces 105, 106 are joined there will be formed a section 130 of the stem that has a smaller diameter than either the semicircular flange 120 or the bulbous region 125 that define the section 130. As explained in further detail below, a spring can be placed between the semicircular flange 120 and the bulbous region 125 around the section 130 and kept in place.

The mating pieces 105, 106 include a tapered section that is in the mid region of each piece. The tapering begins below end 115 and continues to end 116. As a result, the outer diameter of the stem may vary along its length. For example, in one embodiment the outer diameter at the top of the stem may be about 3.5 mm to about 4 mm with the stem being tapered between the top and bottom of the stem. In this embodiment, the outer diameter of the bottom of the stem may be approximately 5 mm. These dimensions can be larger but smaller dimensions will be more difficult because of the combination of a pair of slots 135, 136 and the approximately 1 mm channel.

The taper on the length also provides the ability to create two different length stems for different bobbers. For example, in one embodiment the stem may be 5 inches in length and in another embodiment the stem may be 3.5 inches. If the stem halves are injection molded to be 5 inches, and the taper start 1.5 inches from end 115, by cutting the stem 1.5 inches from the top (end 115) at the start of the taper and discarding the short cut portion, one can manufacture a 5 inch stem and a 3.5 inch stem using the same mold.

Also positioned in section 130 are the pair of slots 135, 136. Each slot 135 extends into the wall of the respective mating pieces 105, 106 and will form a single continuous slot when the mating pieces are joined. The slot 135 includes a circumferential opening in the form of an opening around a portion of the circumference of the stem within section 130. The slot 135 transitions from the circumferential opening into a generally axially- or longitudinally-oriented slot. Although FIGS. 1A and 1B illustrate the slot 135 have a longitudinal orientation in the direction of the bulbous region 125, the longitudinal orientation may be in the opposite direction, i.e., in the direction of the flange 120.

Each slot 136 extends into the wall of the respective mating pieces 105, 106 and will form a single continuous slot when the mating pieces are joined. The slot 136 includes a circumferential opening in the form of an opening around a portion of the circumference of the stem within section 130. The slot 136 transitions from the circumferential opening into a generally axially- or longitudinally-oriented slot. A significant difference between slot 135 and slot 136 is the terminal region 137 of slot 136. In FIGS. 1A and 1B, the terminal region 137 extends into the bulbous region 125.

The above difference between slot 135 and slot 136 provides useful advantages when the stem 100 is assembled, a fishing float mounted and a spring placed in compression over region 130. If a fishing line is placed within the slot 135 by further compressing the spring such that the circumferential opening is uncovered by the spring, and then the spring released, the fishing line's movement will be restricted by interaction of the spring and fishing line. This arrangement provides what is known in the art as fixed bobber fishing. In contrast, when the spring is further compressed such that a fishing line can be passed through the circumferential opening of the slot 136, and the spring released, the fishing line will be forced into the terminal region 137 of the slot and the fishing line's movement will not be hindered by any interaction between the spring and fishing line. This arrangement of the spring and fishing line provides what is known in the art as slip bobber fishing.

Figure 2:
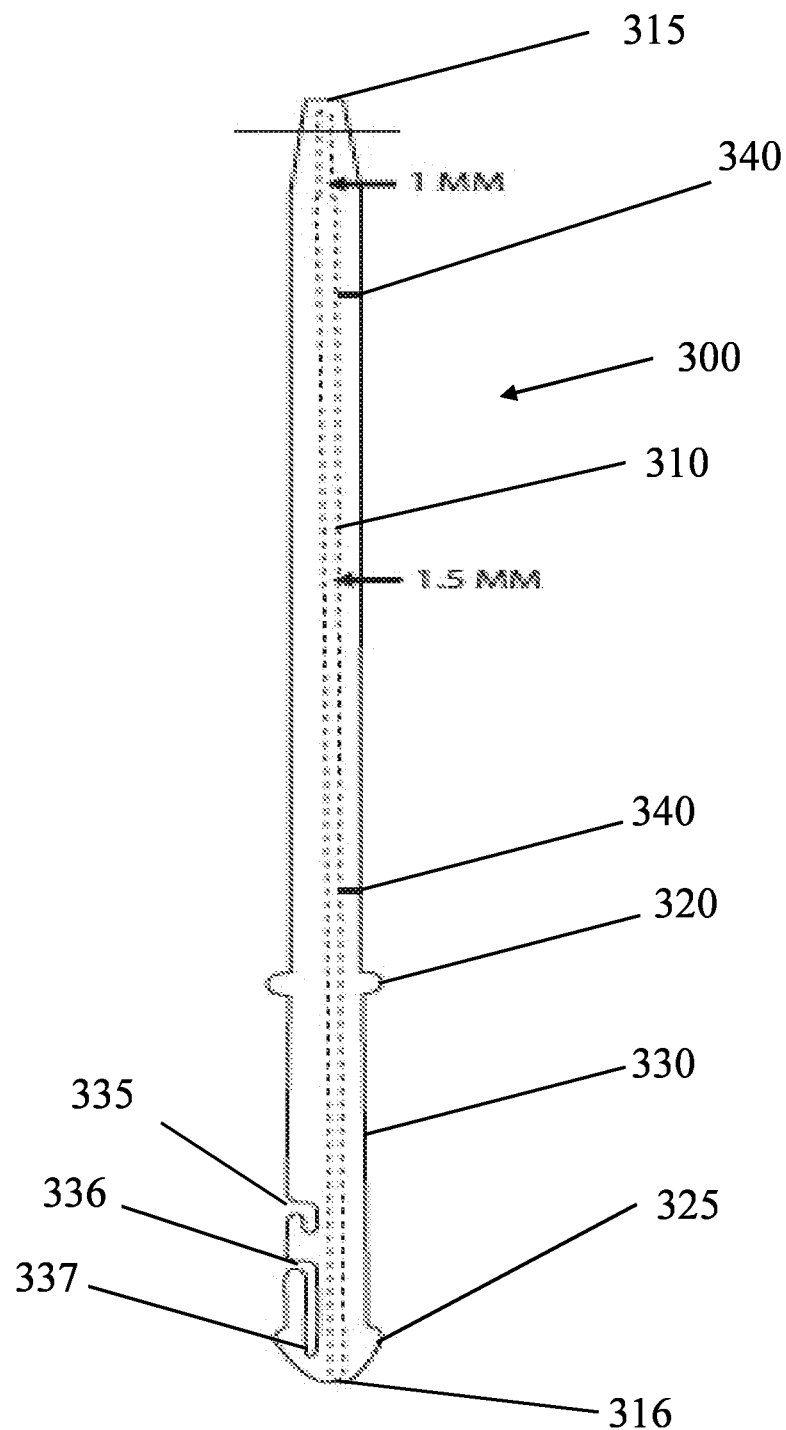
FIG. 2 is a side view of a stem of a second embodiment of a fixed and slip bobber made by injection molding.

Referring to FIG. 2, a fishing float stem 300 may be formed as a single piece by injection molding using one or more bridge pins. As illustrated in FIG. 2, the stem 300 includes an axial channel 310 that passes between a pair of open ends 315, 316. Along the length of the stem there is the semicircular flange 320 that forms a partial or complete flange around the outside circumference of the stem 300. The end 316 includes the bulbous region 325 that extends beyond the outer surface of the stem. Thus, there is the section 330 of the stem that has a smaller diameter than either the semicircular flange 320 or the bulbous region 325 that define the section 330. A spring (not shown in FIG. 2) can be placed between the semicircular flange 320 and the bulbous region 325 around the section 330 and kept in place.

Like the stem 100 of FIGS. 1A and 1B, the stem 300 of FIG. 2 includes a tapered section that is in the mid region of each piece. The tapering begins below end 315 and continues to end 316. As a result, the outer diameter of the stem 300 may vary along its length. For example, in one embodiment the outer diameter at the top of the stem may be about 3.5 mm to about 4 mm with the stem being tapered between the top and bottom of the stem. In this embodiment, the outer diameter of the bottom of the stem may be approximately 5 mm. These dimensions can be larger but smaller dimensions will be more difficult because of the combination of a pair of slots 335, 336 and the approximately 1 mm diameter channel that runs the length of stem 300.

The taper on the length also provides the ability to create two different length stems for different bobbers. For example, in one embodiment the stem may be about 5 inches in length and in another embodiment the stem may be about 3.5 inches. If the stem 300 is injection molded to be 5 inches, and the taper start 1.5 inches from end 315, by cutting the stem 1.5 inches from the top (end 315) at the start of the taper and discarding the short cut portion, one can manufacture a 5 inch stem and a 3.5 inch stem using the same mold and process. Such flexibility provides production, cost and inventory advantages.

Also positioned in section 330 are the pair of slots 335, 336. Each slot 335 extends into the wall of the stem. The slot 335 includes a circumferential opening in the form of an opening around a portion of the circumference of the stem within section 330. The slot 335 transitions from the circumferential opening into a generally axially- or longitudinally-oriented slot. Although FIG. 2 illustrates the slot 335 having a longitudinal orientation in the direction of the bulbous region 325, the longitudinal orientation may be in the opposite direction, i.e., in the direction of the flange 320.

Further, in another implementation, the slot 336 may be configured to have a first portion that is generally perpendicular to the longitudinal axis of the channel 310, a second portion that extends from the first portion in the direction of the opening 316 and is generally parallel to the longitudinal axis of the channel 310, and a third portion that extends from the first portion in the direction of the opening 315 and is generally parallel to the longitudinal axis of the channel 310. Such a slot would have a general T-shape and would closely resemble slot 336 except for the presence of the third portion that extends in the direction of the opening 315. In this implementation the stem is formed without the slot 335. This implementation can be used in all configurations disclosed herein.

Like the slot 136 of FIGS. 1A and 1B, the slot 336 of FIG. 2 extends into the wall of the stem and includes a circumferential opening in the form of an opening around a portion of the circumference of the stem within section 330. The slot 336 transitions from the circumferential opening into a generally axially- or longitudinally-oriented slot. A significant difference between slot 335 and slot 336 is the terminal region 337 of slot 336. As in FIGS. 1A and 1B, the terminal region 337 in stem 300 illustrated in FIG. 2 extends into the bulbous region 325.

The stem 300 can be further processed as described above with respect to FIGS. 1A and 1B to include a fishing float mounted over the stem and a spring placed in compression over the region 330. The resulting fishing float can be used in the same manner as described above with respect to the fishing float of FIGS. 1A and 1B.

The primary difference between the stem 300 illustrated in FIG. 2 compared to the stem 100 illustrated in FIGS. 1A and 1B is the process of injection molding the stem. While FIGS. 1A and 1B rely on injection molding of two pieces that are then attached together, the stem 300 of FIG. 2 is manufactured as a single piece using injection molding with bridge pins. There are significant technical difficulties in injection molding a tube having the dimensions (e.g., length, outer diameter, diameter of lengthwise channel) of the stems disclosed herein. In general, as the length of the tube is increased for a small inner diameter tube, there is an increased risk of damage to the main core pin that is used to form the channel along the length. During injection molding, it was determined that the main core pin would be broken, bent or otherwise damaged such that the inner diameter channel is not suitably formed. The inventor has determined that by using one or more bridge pins that pass through the side wall of the tube forming the stem and into or to the edge of the inner diameter channel, the one or more bridge pins can support the main core pin during the injection molding step. In such a manufacturing configuration, when the pressures and stresses associated with injection molding of plastics are imparted on the main core pin, the one or more bridge pins will support the main core pin and prevent it from being broken, bent or otherwise damaged. Consequently, a suitably dimensions inner channel can be repeatedly formed.

As further illustrated in FIG. 2, each of the one or more bridge pins (not shown) result in bridge pin channels 340 through the side wall of the tube into the channel 310. The bridge pin channels 340 are small in diameter and are not expected to have any impact on the use and operation of the stem 300 in a fishing float. For example, the bridge pin channels 340 will not impede an angler's ability to pass a fishing line through the channel 310 nor will they weaken the strength of the stem 300.

Figures 3A, 3B:
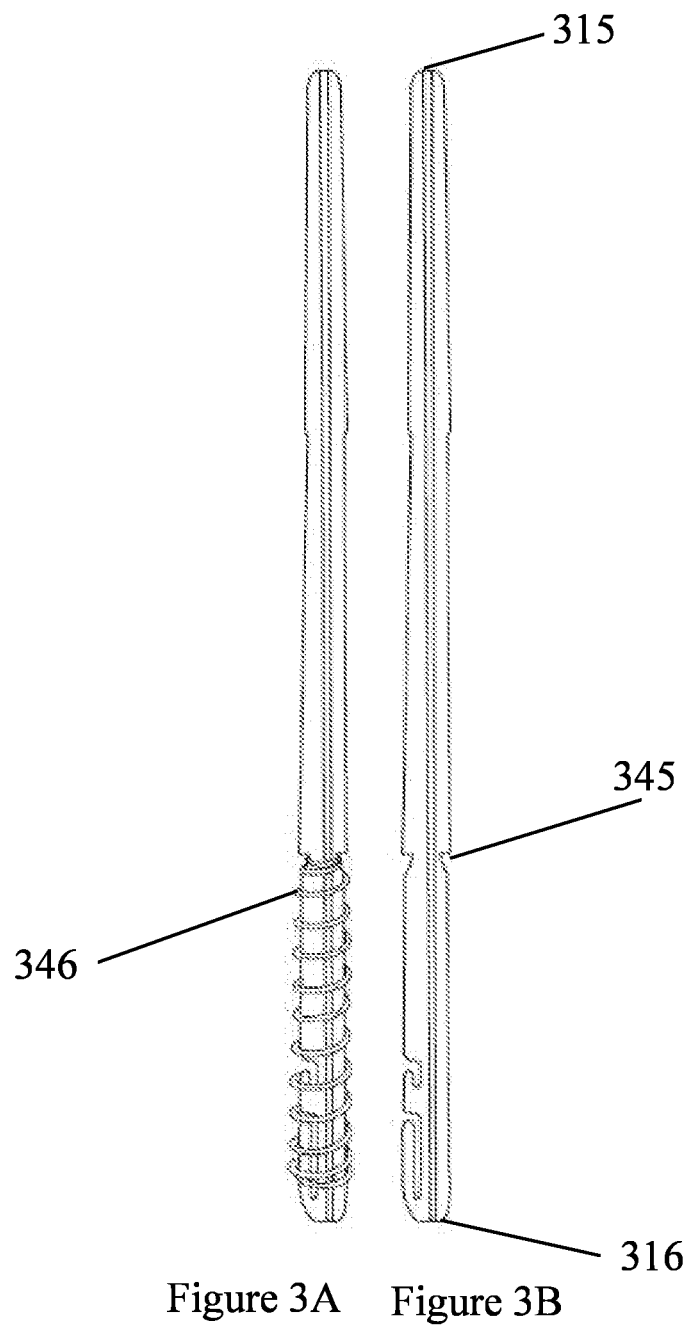
FIGS. 3A-B are side views of a stem of a third embodiment of a fixed and slip bobber made by injection molding.

As noted above, FIGS. 1A-B illustrate the stem 100 having a flange 120 and a bulbous end 125. As should be readily understood, the injection molding process can be operated such that the molds are not configured to produce such features (e.g., flange and/or bulbous end). For example, referring to FIGS. 3A and 3B, the mold(s) can be configured such that the flange 120 is replaced with a tapered region 345 of a dimension to accept the end of a spring 346 and retain the spring in place when either compression or expansion is applied to the spring. Further, the mold(s) can be configured such that the bulbous end 125 is optional and not present in the stem 100. If the spring is sufficiently retained within the tapered region 345, the bulbous end 125 would not be necessary to retain the spring on the stem. As illustrated in FIGS. 3A and 3B, the tapered region 345 is of a sufficient reduction in diameter that the end of the spring 346 is configured to be smaller than the other diameter of the stem below the tapered region but close to the minimum of the outer diameter of the tapered region 345 so that the end of the spring is readily retained in place on the stem. However, in an additional embodiment (not shown), the tapered region can be of less reduction in diameter and the spring can be retained based on a combination of the tapered region and application of glue or heat to the end of the spring in the tapered region.

Figures 4A, 4B:
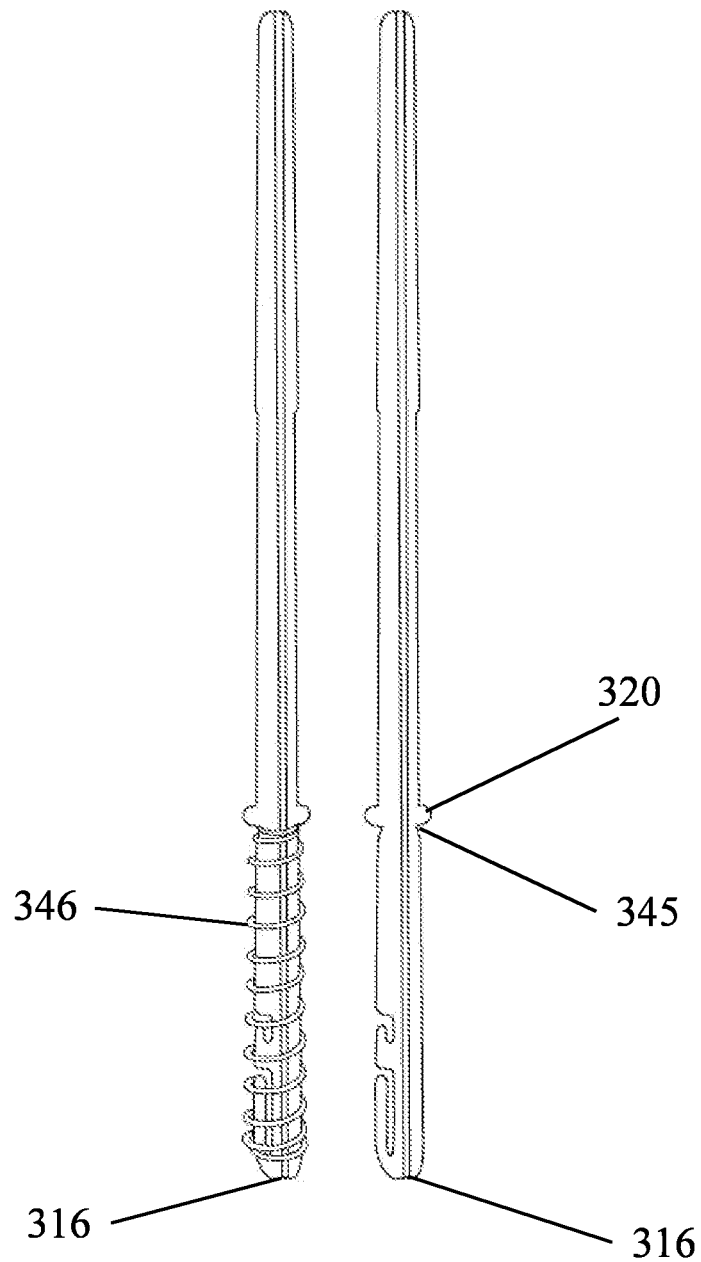
FIGS. 4A-B are side views of a stem of a fourth embodiment of a fixed and slip bobber made by injection molding.

Referring to FIGS. 4A and 4B, in another embodiment, the stem 100 may be arranged to have a tapered region 345 adjacent to a flange 320. In this configuration, the end of the spring 346 may be placed in the tapered region 345 against the flange 320, which together prevents both upward and downward dislocation of the spring. The spring can be compressed upwardly in the direction of the flange but cannot be pulled downwardly in the direction of opening 316. While the end of the spring can be affixed to the tapered region 345, for example by glue or heat molding, such an arrangement without glue or heat molding is expected to sufficiently retain the spring to the stem.

Figures 5A, 5B:
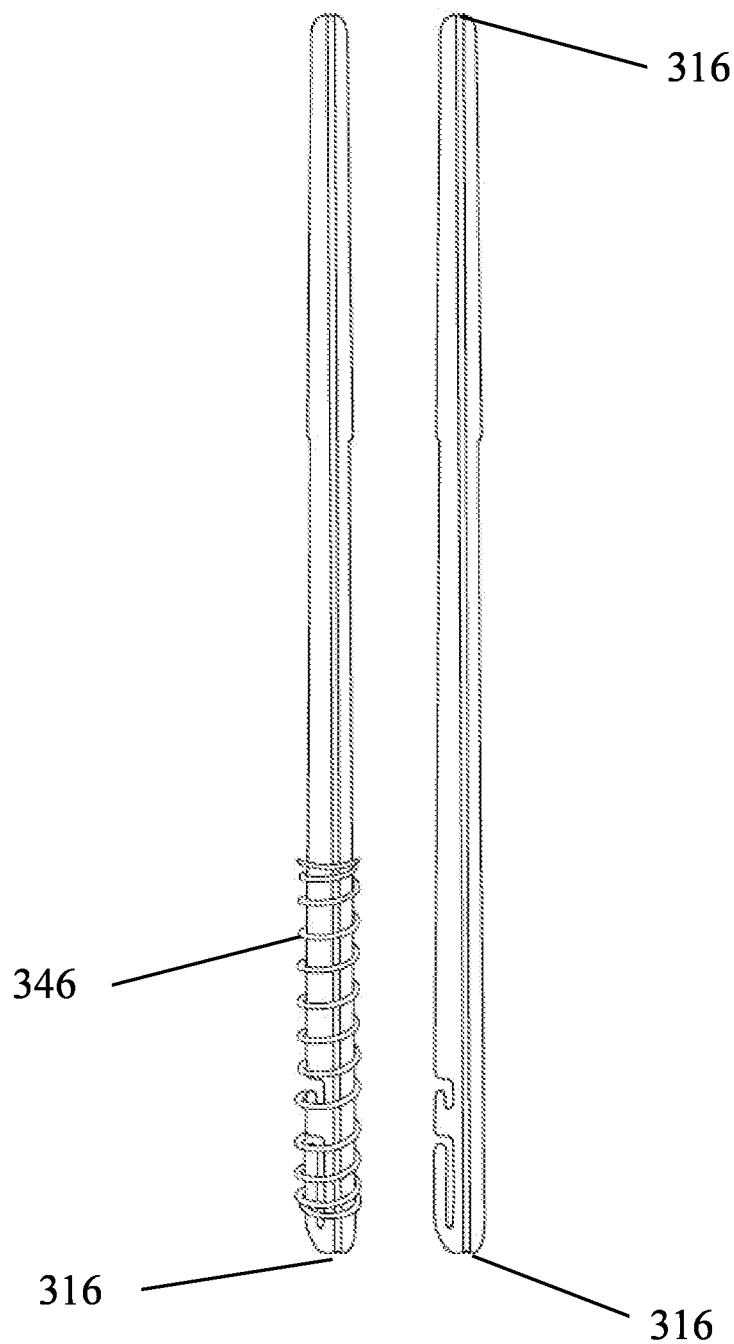
FIGS. 5A-B are side views of a stem of a fifth embodiment of a fixed and slip bobber made by injection molding.

Referring to FIGS. 5A and 5B, in yet another embodiment the stem can be injection molded without the flange 120 or even a tapered region where the flange is formed on the previous embodiments. In this configuration, the spring is retained on the stem using glue or heat molding at the end of the spring positioned towards the center of the stem. Such a configuration permits the angler to compress the spring upwardly towards the center of the stem for both slip and fixed fishing without dislocating the spring on the stem.

Figures 6A, 6B:
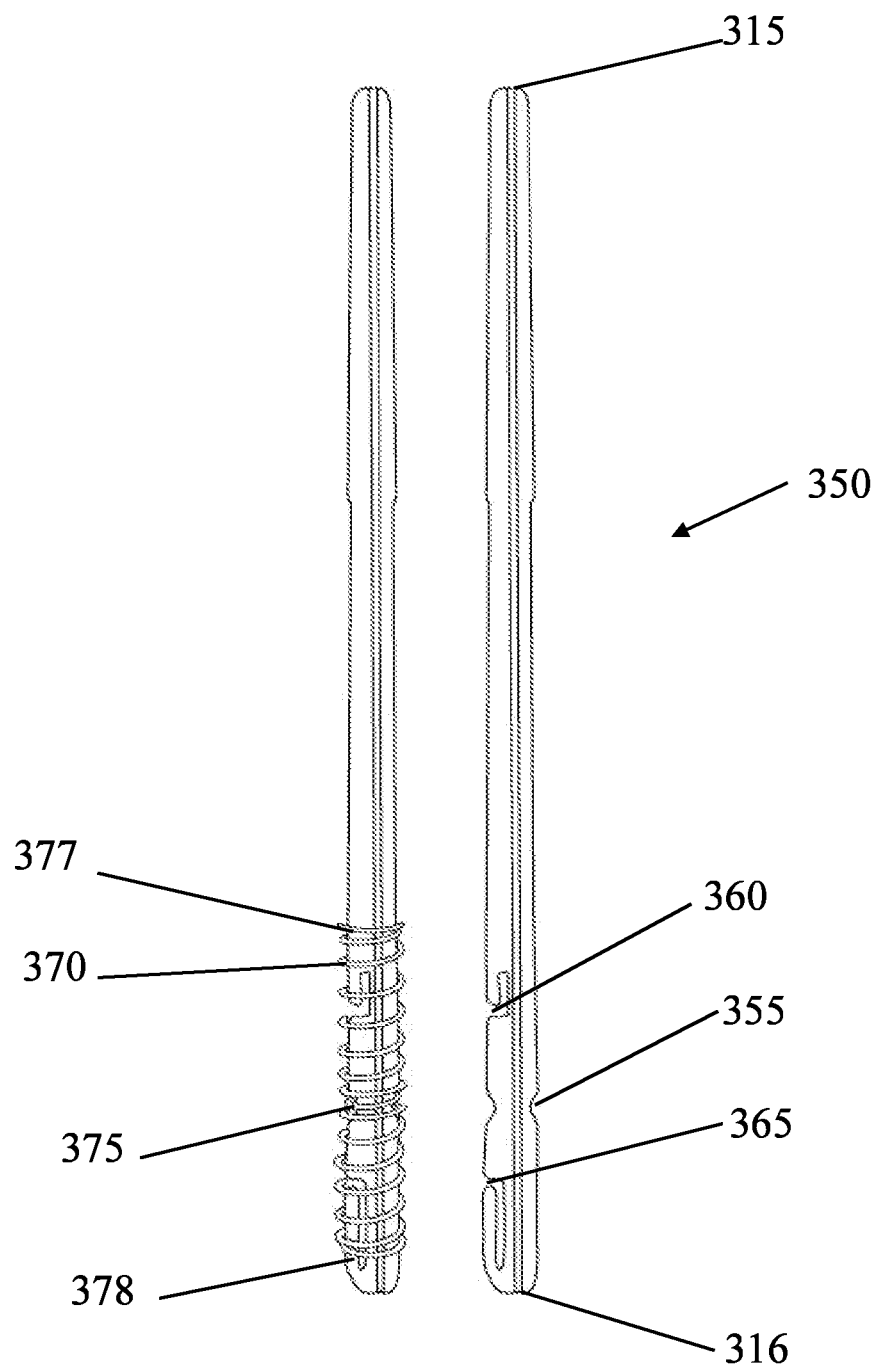
FIGS. 6A-B is a side view of a stem of a fifth embodiment of a fixed and slip bobber made by injection molding.
Figure 7:
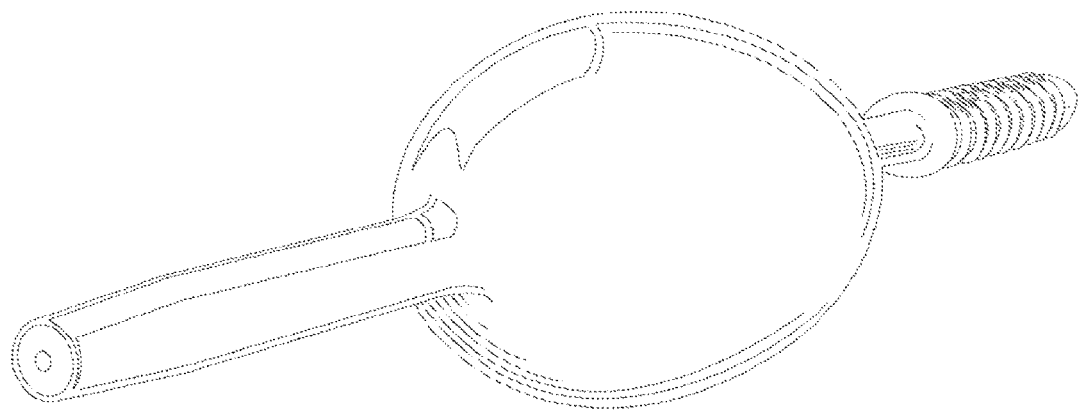
FIG. 7 is a perspective view of a fishing bobber formed from the stem of FIGS. 1A and 1B.
Figure 8:
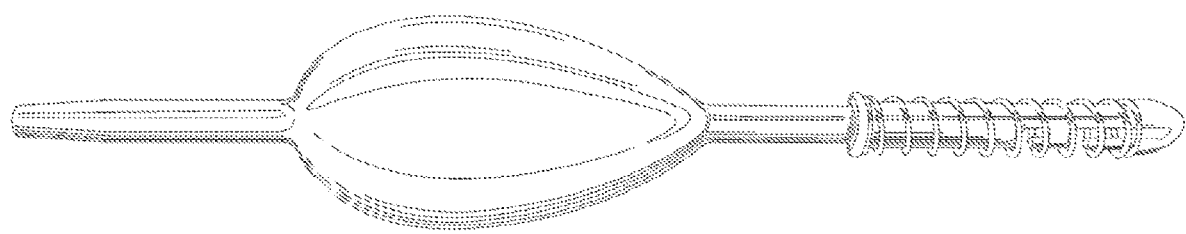
FIG. 8 is a side view of a fishing bobber formed from the stem of FIGS. 1A and 1B.
Figure 9:
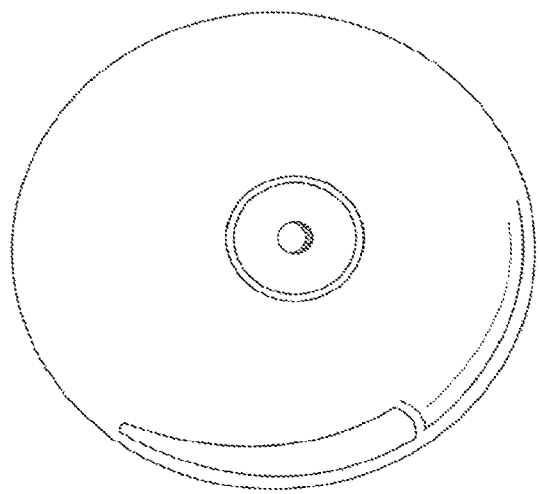
FIG. 9 is a top view of a fishing bobber formed from the stem of FIGS. 1A and 1B.
Figure 10:
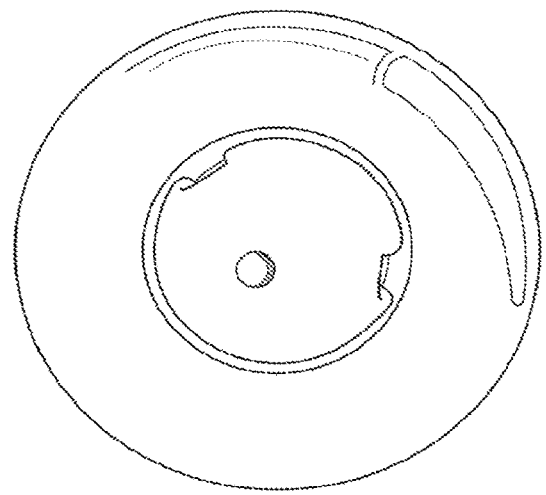
FIG. 10 is a bottom view of a fishing bobber formed from the stem of FIGS. 1A and 1B.

Referring to FIGS. 6A and 6B, in yet another embodiment a stem 350 can be configured to have a tapered region 355 between two slots 360, 365. The slot 360, 365 may be oriented in opposite directions, e.g., away from the direction of the tapered region 355. Unlike the spring used in the embodiments of FIGS. 1A-B to 5A-B, a spring 370 of FIG. 6A has a narrowed center region 375 that fits tightly within the tapered region 355. In this configuration an upper end 377 of the spring 370 can be pulled downwardly to expose the slot 360 so that a fishing line can be passed into the slot. Upon releasing the spring, the upper end 377 of the spring will cover the entirety of the slot 360 such that the fishing line will be fixed in place within the stem to provide fixed fishing. Similarly, if the lower end 378 of the spring 370 is pulled upwardly slot 365 is exposed so that a fishing line can be passed into the slot. Upon releasing the spring, the lower end 378 of the spring will cover a portion of the slot 365 but not the entirety of the slot 365. In this manner, the slot 365 is used for slip fishing with the fishing line sliding through the uncovered portion of the slot 365.

It should be understood that while the embodiments of FIGS. 2A-B to 6A-B consist of a stem formed from a single injection molded part, each of these embodiments can be formed by injection of two halves that are joined together as described herein in FIGS. 1A-B. Further, the various features of each embodiment disclosed in FIGS. 2A-B to 6A-B can be used in such a stem. In other words, each feature may be separately injection molded or one or more of the various features may be injection molded together to form a two piece stem. Similarly, each of the features may be separately injection molded or one or more of the various features may be injection molded together to form a one piece stem using bridge pins. In both instances, the mold(s) are merely configured to provide the various features desired.

Referring to FIGS. 7-10, upon assembly of the fishing float stem described above in FIGS. 1A-B to FIG. 6A-B, a fishing bobber 200 is made by mounting a buoyant float member 210 on the stem 100, 300 from one end and a spring 215 over the stem from the other end. The float member 210 is placed over the stem between the opening 115 and the flange 120 and a friction fit formed between the stem and float member. The combination of the buoyant member and stem then can be painted to provide an attractive appearance that results in the buoyant member looking integral with the stem. If necessary, an adhesive can be applied between the buoyant member and stem prior to painting. Following the painting or other form of modifying the surface appearance, the spring 215 is placed over the stem between the bulbous end 125 and the flange 120. The spring will be in compression between the bulbous end 125 and flange 120.

Variation of slot 135 and slot 136 are possible. For example, while FIGS. 1A and 1B to FIG. 6A-B illustrate the slot 135 and the slot 136 having a longitudinal orientation in the direction of the bulbous region 125, the longitudinal orientation may be in the opposite direction, i.e., in the direction of the flange 120. For the slot 135 the configuration change is rather simple. However, for the slot 136 the terminal region 137 of the slot must extend into the flange 120 such that the spring does not cover the slot and slip bobber fishing is possible. If such a flange feature is not used, then the slot 136, or equivalent, must extend upwardly beyond the location of the end of the spring.

Each slot can be characterized as being formed by an opening that is circumferentially oriented and having at least a first portion that is generally transverse to the longitudinal axis of the stem. The slot includes a second portion that is contiguous with the first portion and at least a portion of the second portion is generally parallel with the longitudinal axis of the stem.

In another variation, the stem 100 can be formed without the bulbous end 125. The spring can be mounted to the stem such that it is mounted over the flange 120 to thereby retain the spring in place on the stem. However, to provide both slip and fixed fishing the slot 136 can extend to the end of the stem beyond the end of the spring. In use, the spring would be compressed in the direction of the flange 120 to pass the fishing line into the slot 135 or the slot 136. Upon releasing the compressed spring the end of the spring would move in the direction of the end of the stem to cover the totality of slot 135 and most of the slot 136. In this manner slot 135 is used for fixed fishing and slot 136 is used for slip fishing.

As explained above, once assembled, the stem 110 has a float member 210 and spring 215 added. To assemble the stem, the two mating pieces 105, 106 are joined. The two mating pieces 105, 106 can be joined by a number of methods, including glue, adhesive, heat welding, friction fit, painting the outside surface, or a combination of these and other well known techniques. In the configuration illustrated in FIGS. 1A and 1B, multiple pairs of pegs and openings 140*a-h* are arranged in opposite positions such that when mated, the pegs and openings provide a friction fit. For example, the pairs of pegs and openings 140*a* and 140*b* may be arranged as pegs 140*a* and openings 140*b* in which the pegs 140*a* are press fit into the openings 140*b*. A variety of arrangements are possible in which piece 105 includes a peg on one side and an opening on the other side, and piece 106 includes an opening on one side and a peg on the other side. Similarly, the pair of pegs and opening 140*e*, 140*f* may be arranged with a peg on piece 105 and an opening on piece 106, or vice versa. Additionally, while multiple pairs are illustrated at the opposite ends and at two locations within the middle, there may be a pair at one location in the middle, three pairs at three locations in the middle, etc. The objective is to provide a secure fit between the mating pieces 105, 106 and, as such, a variety of techniques can be used to join the mating pieces.

The mating pieces 105, 106 are made by injection molding as separate pieces rather than as a single piece. The inventor found that making as a single piece by injection molding would be difficult if not impossible because of the combination of the length of the stem, the wall thickness of the stem, the diameter of the channel 110 along the stem's length, and the slots 135, 136 in the side of the wall into the channel.

The channel 110 has a diameter that may be about 1.5 mm, about 1.3 mm, about 1 mm or less and is large enough to permit conventional fishing line to pass through its length but small enough to prevent a bobber stop from entering the channel. A bobber stop is used in slip bobber fishing to set the distance between the hook and bobber. A typical bobber stop is a thread tied to a fishing line. The bobber stop can be wound into the fishing reel without interfering with the operation of the fishing reel. However, the opening into the channel in the stem is designed such that its inner diameter is smaller than the diameter of the bobber stop. In this manner the opening into the channel will not accept the bobber stop into the opening and channel. As such, upon casting the fishing line the hook and sinker will enter the water and sink, pulling the fishing line through the channel into the water. However, when the bobber stop reaches the opening into the channel, the interaction between the bobber stop and the opening will cause the bobber stop to stay in place against the opening. Simultaneously this interaction will cause the fishing line to also stop moving through the channel. In this manner, the placement of the hook relative to the fishing bobber can be fixed. As such, it is critical that the opening into the channel be smaller than the bobber stop. Typically, a bobber stop is approximately 1 mm in diameter. If the opening into the channel is greater than 1 mm, then typically a bead also is used in the slip bobber fishing. The bead has a channel therethrough in which the fishing line is passed with the bead placed on the line between the opening and the bobber stop. The fishing line passes through the bead and fishing bobber until it reaches the bobber stop, with the interaction between the opening, bead and bobber stop causing the movement of the fishing bobber relative to the fishing line to stop.

Therefore, based on the constraints described above, the radius of the channel 110 in each mating piece would be in the range of approximately 0.4 mm to 0.5 mm to give a channel diameter of about 0.8 mm to about 1 mm when the pieces 105, 106 are assembled. If a bead is to be used, then the radius of the channel in each mating piece would be in the range of about 0.5 mm to about 1.0 mm, although larger diameters are possible with a bead of sufficient outer diameter.

Because the length of the stem is approximately 3-6 inches, the pin would be greater than 3-6 inches in length and would need to be less than 1-2 mm in diameter. Such a pin would be fragile and would not be expected to be used many times before breaking or being otherwise damaged. When a molded product is removed from the mold typically the product sticks to the moving side of the mold when the mold opens. Then the molded product is ejected using ejector pins. A problem known as sticking occurs when the molded part fails to separate from either the stationary mold or the moving mold. If the product fails to separate from the moving mold, the ejector pin can be broken. This problem arises when the mold draft is too small, or if the molding process results in too much residual pressure, of if the mold finish is perpendicular to the molded part release direction, or if too much shrinkage occurs. One solution was to apply a molding parting agent to the pin that would form the longitudinal channel. However, such a solution was believed to be unlikely to be successful because of the small diameter of the pin and the length of the channel that the pin forms. It is believed that the combination of the small diameter of the pin in the longitudinal channel along with one or more of the above problems makes molding the stem described herein as a single piece impossible. Consequently, the two part solution was developed and surprisingly found to successfully give the two stem parts.

Figures 11A, 11B:
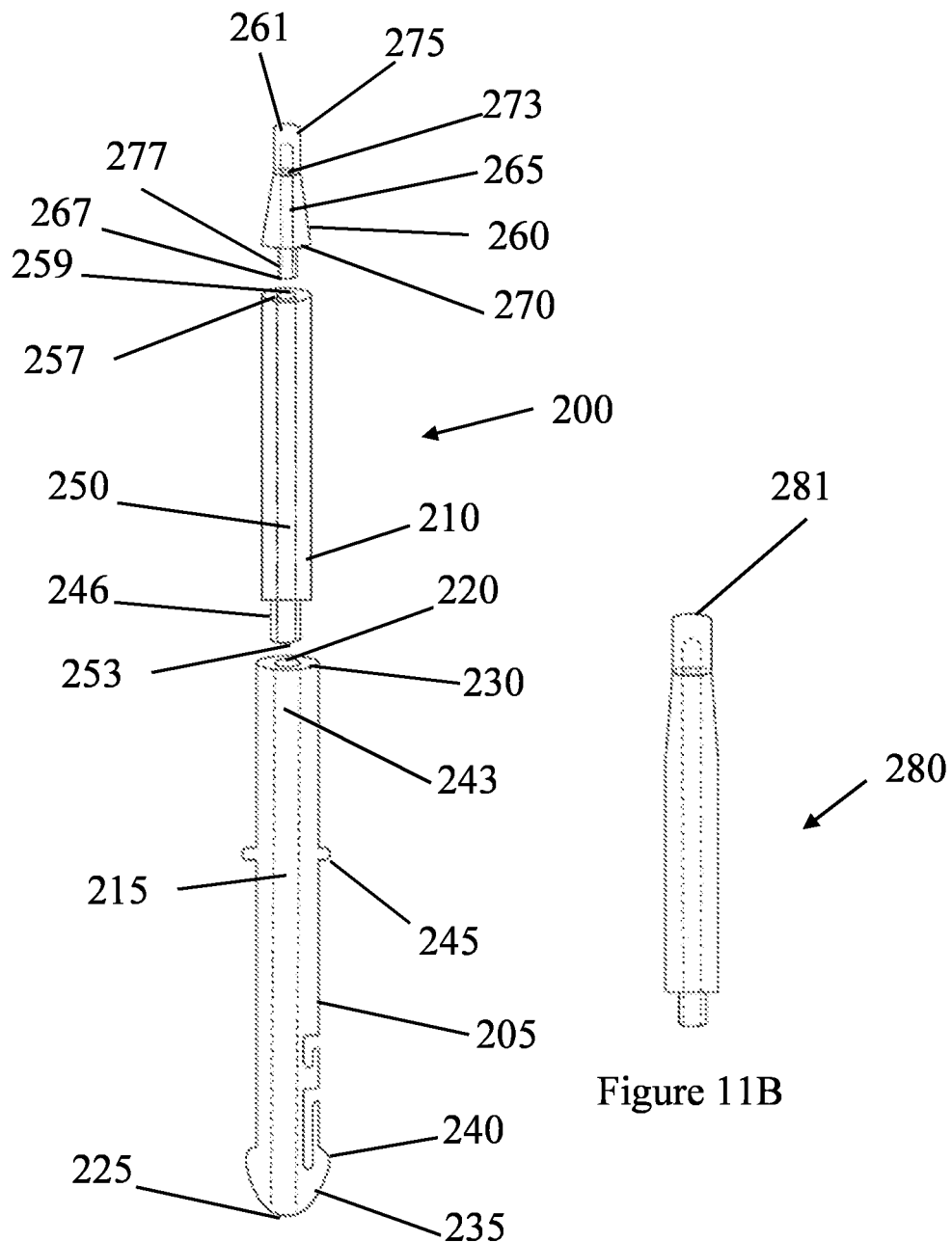

Referring to FIGS. 11a-b, in an additional embodiment of a fixed and slip bobber, the bobber product is assembled from two pieces and may optionally include a third piece. FIG. 11a illustrates a fixed and slip bobber 200 assembled from a first stem portion 205 and a second stem portion 210. The first stem portion is in the form of a tube having a channel 215 along its longitudinal axis, although not necessarily centered within the tube. For example, the channel 215 may be centered at a first end 230 but off center at a second end 235. Alternatively, the channel may be off center at both ends 230, 235. The channel 215 passes between a first open end 220 at the first end 230 and a second open end 225 at the second end 235. The second end 235 includes a first flange, one or more protrusions or other projection(s) 240 extending from the outer surface of the stem that function to expand the outer diameter of the tube at a location to retain a spring on the tube, as explained further. Between the ends 230, 235 a second flange, one or more protrusions or other projection(s) 245 extend from the outer surface of the tube. A spring (not shown) can be retained in compression between the flanges 240, 245. It should be understood that the first flange 240 and second flange 245 are optional and other means may be used to retain a spring to the stem. For example, in place of or in addition to the flange 245, the stem may include a region with a narrowed diameter to retain a spring in which one end of the spring has a narrowed end.

The first stem portion 205 also includes one or more fishing line receiving slots into which a fishing line may be placed for fixed fishing or slip fishing. For slip fishing, the slot extends past the first flange 240 so that the fishing line can pass unimpeded by the spring through the slot. Although FIG. 11a does not show the slot for slip fishing passing below the first flange 240 but such a configuration is readily understood by one of skill in the art and is illustrated, for instance, in FIG. 12. For fixed fishing, the slot does not extend past the first flange 240. In this configuration, the spring presses the fishing line against the flange to thereby prevent movement of the fishing line through the slot.

The first stem portion 205 may optionally include a slightly larger inner diameter channel portion 243 that extends for a short distance at the first open end 220 at the first end 230. The length of the short distance of the channel with a larger inner diameter 243 may be approximately 3-10 mm, preferably about 7 mm. The larger diameter channel portion 243 is configured to receive a nipple portion 246 extending from the second stem portion 210.

The diameter of the channel 215 is approximately 1 mm to 1.5 mm and the diameter of the channel portion 243 is approximately 2.5 to 3 mm, preferably about 2.75 mm. In another embodiment, the diameter of the channel 215 varies over its length with an inner diameter of about 1.5 mm at one end and a diameter of 2.75 mm at the opposite end. For example, the opening at the top end may have an inner diameter of about 2.75 mm, the opening at the bottom end may have an inner diameter of about 1.5 mm and the inner diameter of the channel decreases along its length from the top end to the bottom end. The length of the tube is about 50 to about 70 mm. The tube is injection molded with a pin that provides the diameter of the channel 215 and channel portion 243.

The second stem portion 210 is in the form of a tube with a channel 250. The second stem portion 210 has a first end 253 with an opening 255, a second end 257 with an opening 259 and the channel 250 passes between openings 255, 259. The opening 255 is at nipple portion 246 and opens into channel 215 when the nipple portion 246 is inserted into channel portion 243 via an interference fit.

The diameter of the channel 250 is approximately 1 mm to 1.5 mm. In another embodiment, the diameter of the channel 250 varies over its length with an inner diameter of about 1.5 mm at one end and a diameter of 2.75 mm at the opposition end. For example, the opening at the top end may have an inner diameter of about 2.75 mm, the opening at the bottom end may have an inner diameter of about 1.5 mm and the inner diameter of the channel decreases from the top end to the bottom end. The length of the tube is about 50 to about 70 mm. The tube is injection molded with a pin that provides the diameter of the channel 250 and the nipple portion 246. The nipple portion has a length of about 3-9 mm, preferably about 7 mm and an outer diameter of about 2.5 to 3 mm, preferably about 2.75 mm.

The first stem portion 205 is assembled to the second stem portion 210 by inserting the nipple portion 246 into the channel portion 243 and retained, in part, by the use of an interference fit to form a joint between stem portions 205, 210. A float portion (not shown) may be mounted over the joined stem portions to surround the joint and use an interference fit to further strengthen the retention of stem portion 210 in stem portion 205.

The embodiment of FIG. 11a also includes an optional cap 260 (labeled CAP in FIG. 11). The cap 260 is a molded plastic piece that has an inner channel 265 passing between a first opening 267 as a first end 270 and a second opening 273 at a second end 275. A nipple 277 extends from the first end 270 and terminates at the opening 267. The cap 260 may be configured in a variety of shapes from tapered to straight to having a curved end 275. The inner channel 265 has a diameter of approximately 1 mm to 1.5 mm. The nipple has a length of about 3-9 mm, preferably about 7 mm and an outer diameter of about 2.5 to 3 mm, preferably about 2.75 mm. The length of the cap 260 can range over a variety of lengths from about 4 mm to about 40 mm, preferably about 8 mm to about 31 mm (excluding the length of the nipple portion). For example, a longer optional cap 280 is illustrated in FIG. 11b and is similar to cap 260 except for its length.

The optional caps 260, 280 are illustrated as being formed with the channel being closed at the end opposite to the nipple portion. If the cap is formed through injection molding in this manner, the closed end 261, 281 is later cut to form the second opening 273. FIG. 11b illustrates the cap 280 being injection molded to have a longer length (e.g., about 14 mm (excluding the nipple portion)) with a short portion of about 6 mm being cut off. In FIG. 11b, the cap 280 may have a length of about 29-32 mm, e.g., about 31.2 mm, with a portion that is to be cut off. The portion to be cut off may be, for example, approximately 5 mm to approximately 7 mm. It should be understood that the exact length to be removed from the cap is not critical.

To assemble the cap 260 or cap 280 to the assembled stems 205, 210, the nipple portion of cap 260 or cap 280 is inserted into the opening 259 in the second stem portion 210 and retained in place through an interference fit. The assembled cap 260, stem 205 and stem 210 have a length of approximately 120 to 135 mm, preferably about 127 mm. The assembled cap 280, stem 205 and stem 210 have a length of approximately 140 to 155 mm, preferably about 127 mm. In another embodiment, the assembled product consists of the stem 205 and cap 280 with a length of approximately 85 mm to 100 mm, preferably about 90 mm. The stem 205 and cap 280 are assembled and then the float portion is mounted as discussed above to enclose the joint formed between stem 205 and cap 280.

Figure 12:
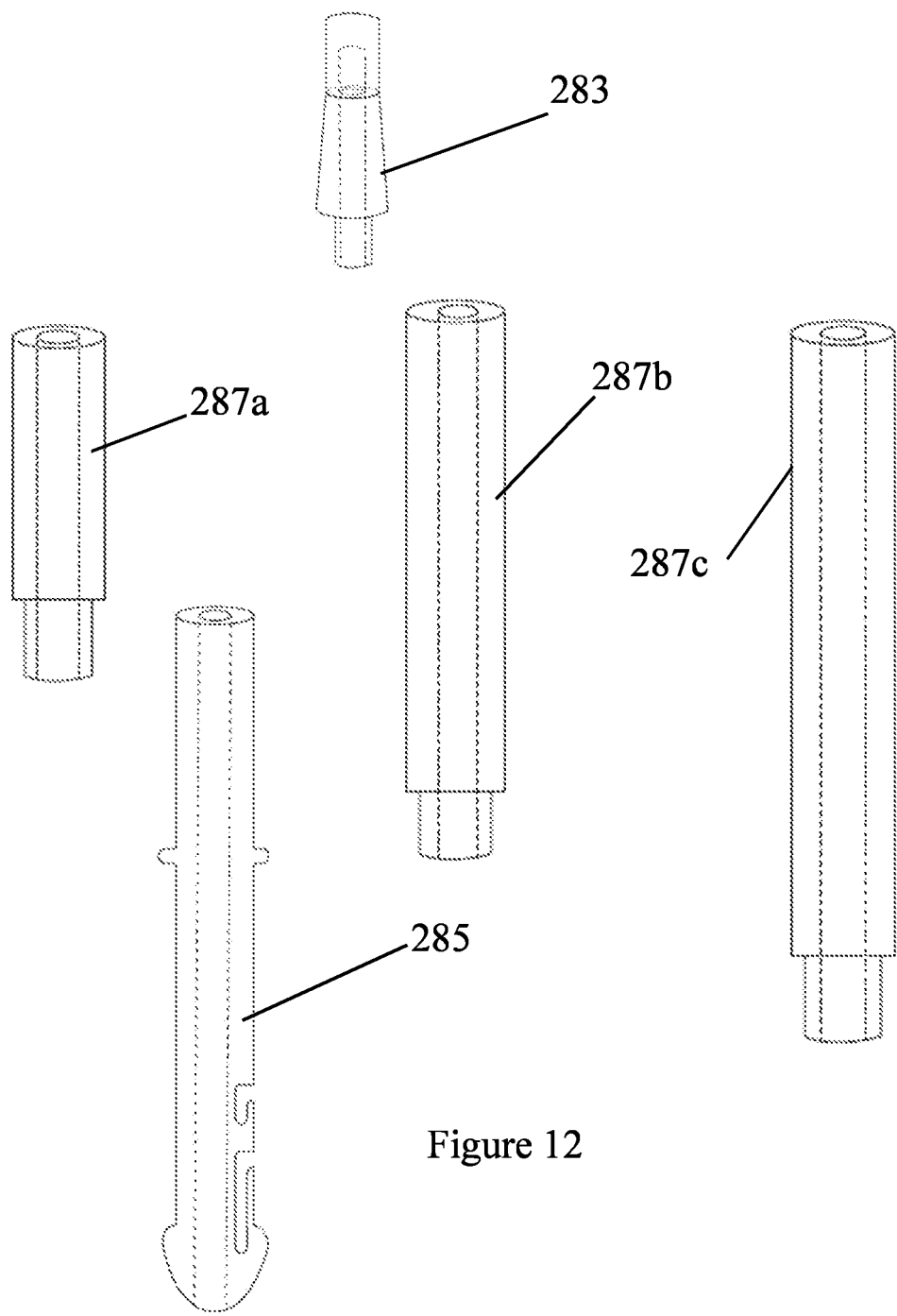
FIG. 12 is a front view of unassembled opposite parts that form the stem of a modification of the second embodiment of a fixed and slip bobber.

FIG. 12 provides additional configurations of the embodiment of FIG. 11a. The configurations illustrated in FIG. 12 provide designs for three different lengths of the assembled device. The cap 283 is configured to have the same or similar dimensions as the cap 260 of FIG. 11a. The stem 285 has a pair of slots for receiving a fishing line. The stem 285 is similar to the stem 205 except for the length, which is about 60 mm to 70 mm, preferably about 64 mm, compared to the approximately 60 mm length of the stem 205.

The configurations of FIG. 12 include three different length versions of the stem 210 of FIG. 11a ranging in length from about 17 mm to about 60 mm. For example, FIG. 12 illustrates a stem 287a having a length of for example about 19 mm, a stem 287b having a length of about 46 mm and a stem 287c having a length of about 56 mm. The overall lengths of the three fishing float stems illustrated in FIG. 12 range between approximately 80 mm to 140 mm, preferably about 90 mm to about 130 mm, most preferably about 91 mm, about 117 mm and about 127 mm Other lengths are included within this invention. As other non-limiting examples of other dimensions, the cap may have a length of about 21 mm divided into a 7 mm nipple, a 8 mm mid-section and a 6 mm end section that is cut off to open the channel. The channel may have an inner diameter of about 1.5 mm. The outer diameter of the nipple portion of the cap may be about 2.75 mm and the nipple may have a length of about 7 mm. The channel in the stems 287a, 287b, 287c may have an inner diameter of about 1.5 mm with the nipple portion having an outer diameter of about 2.75 mm. The upper end of the stem 287a, 287b, 287c has an opening with the channel having an inner diameter of about 2.75 mm so as to receive the nipple from the cap. The length of the channel having an inner diameter of about 2.75 mm may be about 7 mm, which corresponds generally to the length of the nipple that is inserted into the channel. The inner diameter of the channel then is reduced to about 1.5 mm.

The lower stem portion 285 has similar dimensions for the inner diameter and the channel opening into which a nipple is inserted. For example, the lower stem portion 285 has an upper opening with the channel having an inner diameter of about 2.75 mm so as to receive the nipple from the stems 287a, 287b, 287c. The length of the channel having an inner diameter of about 2.75 mm may be about 7 mm, which corresponds generally to the length of the nipple that is inserted into the channel. The inner diameter of the channel then is reduced to about 1.5 mm. The lower segment can have a length of about 60 to 70 mm, e.g., 63 to 66 mm.

Using the configurations described above in FIG. 12, fishing float stems can be assembled that have lengths of about 85-95 mm, about 110-125 mm, or about 120-135 mm.

The configurations of FIG. 12 permit a single core pin to be used for both stem 285 and stem 287, which provides advantages in costs and manufacturing efficiencies.

Figure 13:
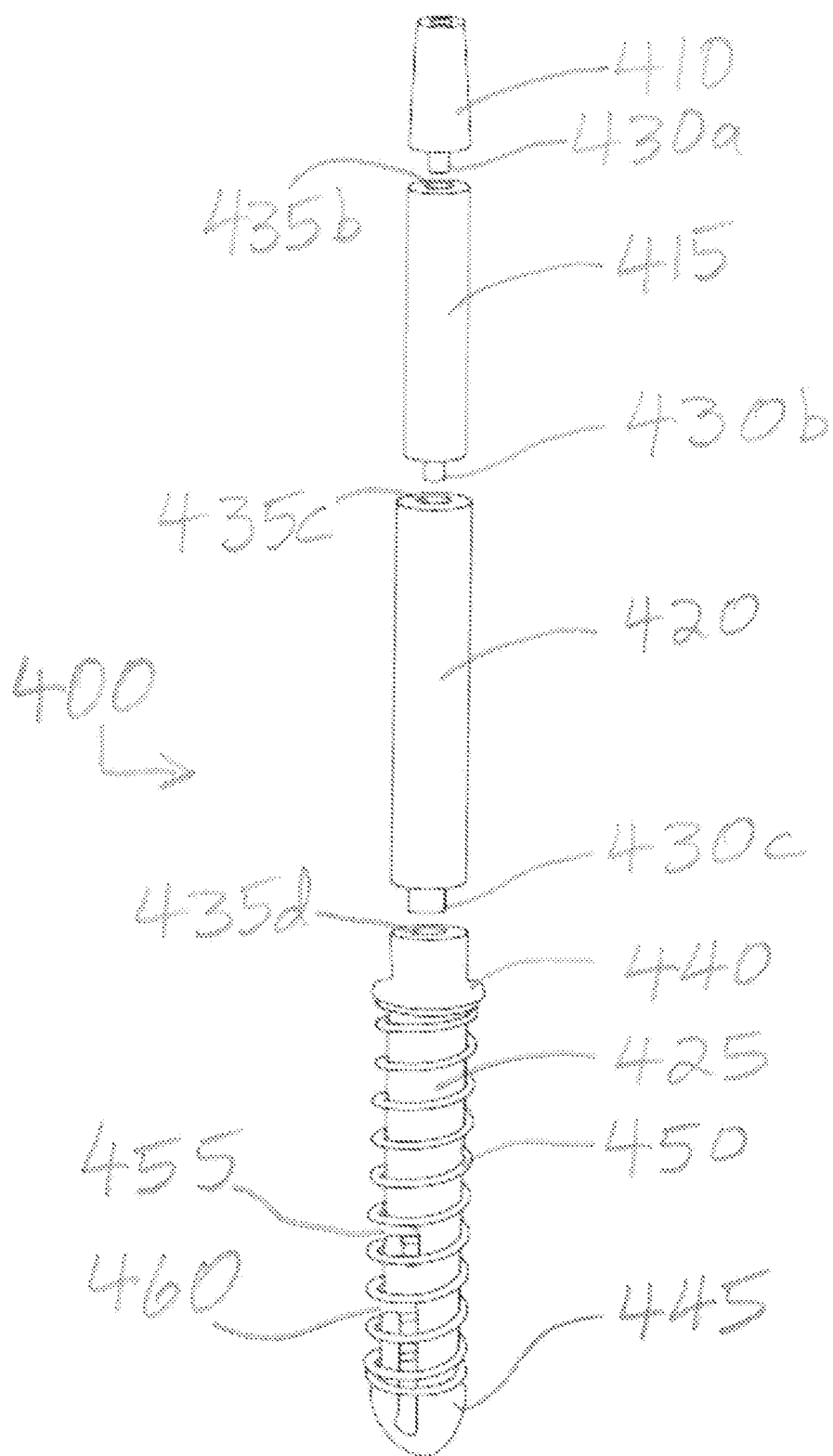
FIG. 13 is a front view of four unassembled stem portions that form the stem of a modification of the second embodiment of a fixed and slip bobber.

Referring to FIG. 13, in another embodiment of a multi-piece bobber assembly for fixed and slip fishing, the bobber product is assembled from up to four pieces including a cap. FIG. 13 illustrates a fixed and slip bobber 400 assembled from a cap 410, a first stem portion 415, a second stem portion 420, and a third stem portion 425. Each of the cap 410, first stem portion 415, second stem portion 420 and third stem portion 425 include a channel long its length that passes between a pair of openings or an opening and a nipple. Further, the cap, first stem portion and second stem portion each include a nipple 430a, 430b, 430c, respectively. The nipples are insertable into openings of the adjacent portion, e.g., nipple 430a of cap 410 is inserted into an opening 435b in first stem portion 415, nipple 430b is inserted into an opening 435c in second stem portion 420, and nipple 430c is inserted into an opening 435d in third stem portion 425.

The third stem portion 425 includes a flange 440 and a bulbous end 445 between which a spring 450 is positioned. The spring encircles a first slot 455 and a second slot 460 that are used for fixed and slip fishing, respectively.

Each of the cap and the stem portions have a channel along its longitudinal axis, although not necessarily centered within the tube. For example, the channel may be centered at an upper end (e.g., the cap) but off center at a lower end. Alternatively, the channel may be off center at both the upper and lower ends.

It should be understood that either or both of the flange 440 and bulbous end 445 of FIG. 13 are optional and the spring may be retained on the third stem portion using any of the features disclosed herein (e.g., tapered regions, glue, heat molding). These features are present or absent based on the mold used.

Finally, it should be understood that the configurations of FIGS. 11-13 can be modified using the various features disclosed herein. For example, the flange and bulbous end disclosed in FIGS. 11-13 may be removed and replaced with the features described above for retaining the spring. For example, a narrowed region may be provided between the slots and a spring configured to have a narrowed central region that mates with the narrowed region in the stem, as disclosed in FIG. 6. In other embodiments, the flange can be replaced with a tapered region to retain the spring, as disclosed in FIGS. 3A-B or the flange can be augmented with a tapered region to retain the spring, as disclosed in FIG. 4A-B. In these configurations, the bulbous end region is not required.

Figure 14:
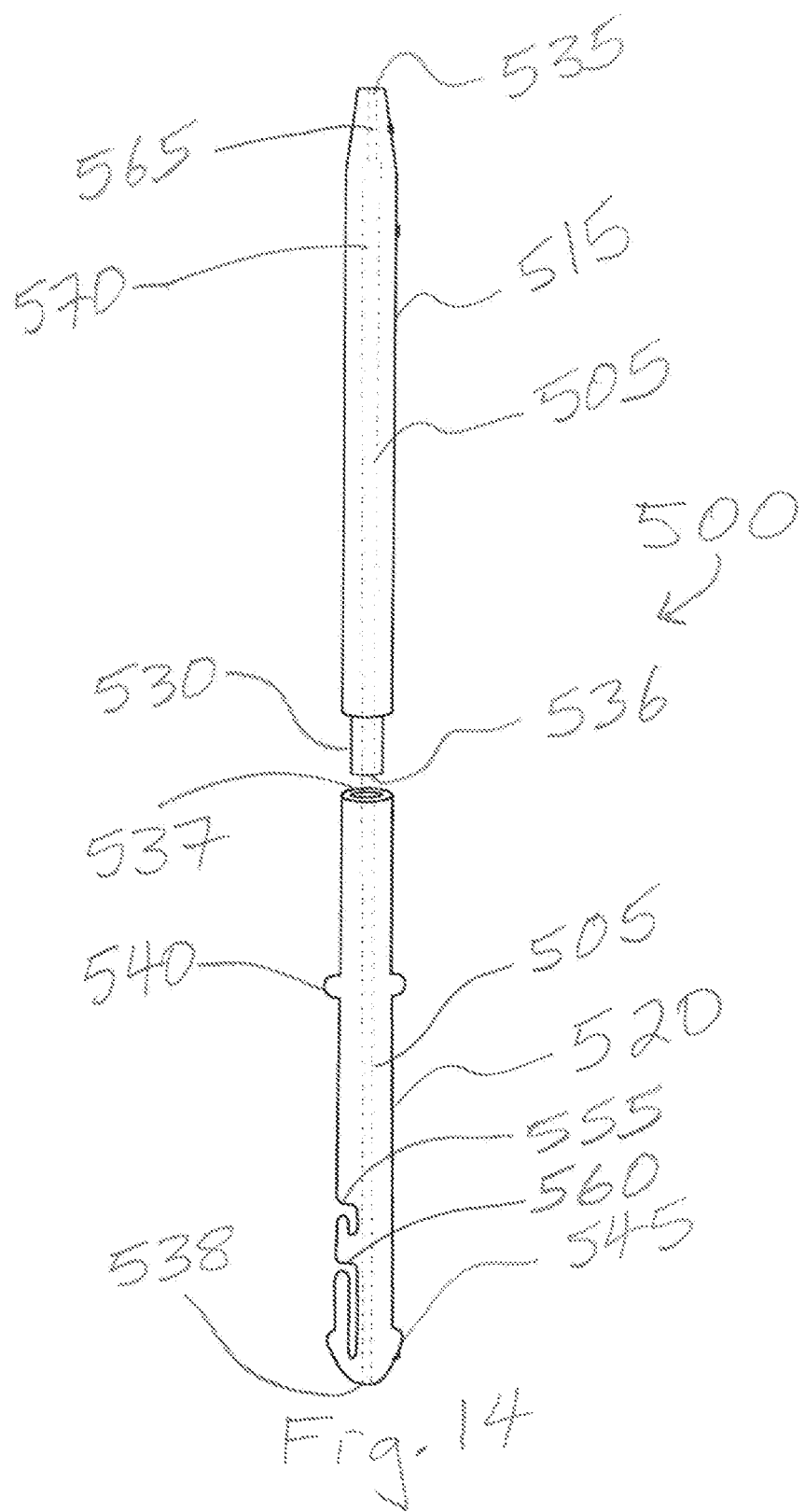
FIG. 14 is a front view of two unassembled stem portions that form the stem of a modification of the second embodiment of a fixed and slip bobber.

Referring to FIG. 14, in another embodiment of a multi-piece bobber assembly for fixed and slip fishing, the bobber product is assembled from only two pieces. FIG. 14 illustrates a fixed and slip bobber 500 assembled from a first, upper stem portion 515 and a second, lower stem portion 520. The first, upper stem portion 515 includes a channel 505 along its length that passes between a pair of openings 535, 536 and the second, lower stem portion 520 includes a continuation of the channel 505 along its length that passes between a pair of openings 537, 538. The first, upper stem portion 515 includes a nipple 530. The nipple is insertable into the opening 537 of the second, lower stem portion 520, e.g., nipple 530 of the first, upper portion is inserted into the opening 537 in the second, lower stem portion 520.

The nipple 520 can be tapered, angled, straight or otherwise configured to be easily inserted into the opening 537. Similarly, the opening 537 can be configured to easily receive the nipple 520. The opening 537 can be of a first wider diameter and then transition into a second narrower diameter to ensure the nipple is easily received into the opening 537.

The second, lower stem portion 520 includes an optional flange 540 and a bulbous end 545 between which a spring or sleeve (not shown) may be positioned. In use, the spring encircles a first, upper slot 555 and a second, lower slot 560 that are used for fixed and slip fishing, respectively.

The channel 505 through the stem portions passes along the longitudinal axis of the stem portions but is not necessarily centered within the stems. For example, the channel may be centered at an upper end of the upper stem portion but off center at a lower end of the lower stem portion. Alternatively, the channel may be off center at both the upper and lower ends. In FIG. 14, the channel 505 in the first, upper stem portion 515 has two segments, a first narrower diameter segment 565 and a second wider diameter segment 570. The first, narrower segment 565 has a diameter of approximately 1 mm, or is within a range of approximately 0.9 to 1.1 mm. The second, wider segment 570 has a diameter of approximately 1.5 mm, or is within a range of approximately 1.1 to 1.6 mm. The narrower segment 565 is sized to permit an angler to use the channel 505 for slip fishing such that a knot on the line for slip fishing will be unable to enter the opening 535 and thereby stop movement of the float along the fishing line. The wider segment 570 is sized to permit the fishing line to easily pass through the channel 505 when slip fishing.

It should be understood that either or both of the flange 540 and bulbous end 545 of FIG. 14 are optional and the spring may be retained on the second, lower stem portion using any of the features disclosed herein (e.g., tapered regions, glue, heat molding). These features are present or absent based on the mold used.

The float 500 is formed by a process that involves a first step of injection molding each of the first segment 515 and the second segment 520. The length of the first segment and the second segment must be less than approximately 3 inches, more particular less than approximately 2.5 inches and even more particularly less than approximately 2 inches. The inventor has determined that if the length of the segments is longer than these lengths, with the inner diameter being approximately 1 to 2 mm, the core pin used for the injection molding process can be damaged. As disclosed herein, either one or more bridge pins must be used, shorter segments must be used, or opposite halves must be formed and joined together.

Upon forming the first and second segment, a second step follows of inserting the nipple 530 into the opening 537 to form a fishing float stem consisting of the first segment 515 and the second segment 520. Upon thereby assembling the fishing float stem, in a third step a balsa float can be mounted around the fishing float stem to cover some or all of the slots in the lower portion of the fishing float stem. Additional steps may follow, including painting the stem and/or float to have the desired appearance.

Finally, it should be understood that the configurations of FIG. 14 can be modified using the various features disclosed herein. For example, the flange and bulbous end disclosed in FIG. 14 may be removed and replaced with the features described above for retaining the spring. For example, a narrowed region may be provided between the slots and a spring configured to have a narrowed central region that mates with the narrowed region in the stem, as disclosed in FIG. 6. In other embodiments, the flange can be replaced with a tapered region to retain the spring, as disclosed in FIGS. 3A-B or the flange can be augmented with a tapered region to retain the spring, as disclosed in FIG. 4A-B. In these configurations, the bulbous end region is not required.

Referring to FIGS. 15-20, the fishing float stems described herein upon assembly can have a variety of configurations for retaining a spring or sleeve around the one or more slots in the lower portion of the assembly stem. The fishing float stem may be formed without the use of an upper flange and/or a lower flange or bulbous region to retain the spring or sleeve. Further, the slots can be formed with a variety of configurations beyond those illustrated herein.

Referring to FIGS. 15a-b, a fishing float stem 600 is formed using the methods disclosed herein. The float stem 600 is formed without the use of a lower flange or bulbous region to retain the spring or sleeve. Instead, the spring or sleeve is retained on the stem using other means, such as glue, heat molding, or a narrowed region of the stem, or a combination of the above. The stem 600 includes an axial channel 603 that passes between a pair of open ends 606, 609 and an outer surface 612 that extends between the two ends. Along the length of the stem there is a semicircular flange 615 that forms a partial or complete flange around the outside circumference of the stem 600. The flange 615 is adjacent to a narrowed region 618 with an outer diameter that is less than the outer diameter of both the flange 615 and the stem adjacent to the narrowed region 618. The spring has an end 621 that has a reduced inner diameter compared to the rest of the spring. The end 621 fits within the narrowed region 618 and prevents removal of the spring from the stem. The spring also has an opposite end 624 that is of a larger diameter than the stem and can be moved up on the stem without displacing the end 621 of the spring. The spring also includes a middle portion 627 between the ends 606, 609.

The stem 600 also includes a pair of slots 630, 633 into which a fishing line can be placed for either fixed or slip fishing. Each slot includes first segment with a length that extends into the elongated rod from an outer surface of the elongated rod at a first position on the elongated rod and passes between opposed openings on the outer surface of the elongated rod. Each slot also may include a second segment that extends from the first segment. The first and second segments may be at an angle to each other. As evident from FIGS. 15a-b, the first and second slots are not in communication with each other. Further, the spring encompasses or surrounds at least a portion of both slots, or may encompass or surround all of one slot and a portion of the other slot.

The stem 600 may be further processed to include a float portion (not shown) surrounding a portion of the stem. The float portion may be of a variety of shapes, such as elongated, round, spherical, etc. The float portion may be integral with the stem through either molding, use of an adhesive, use of heat, etc. The float portion also may be removable from the stem and replaceable with a different float portion.

Figure 16A:
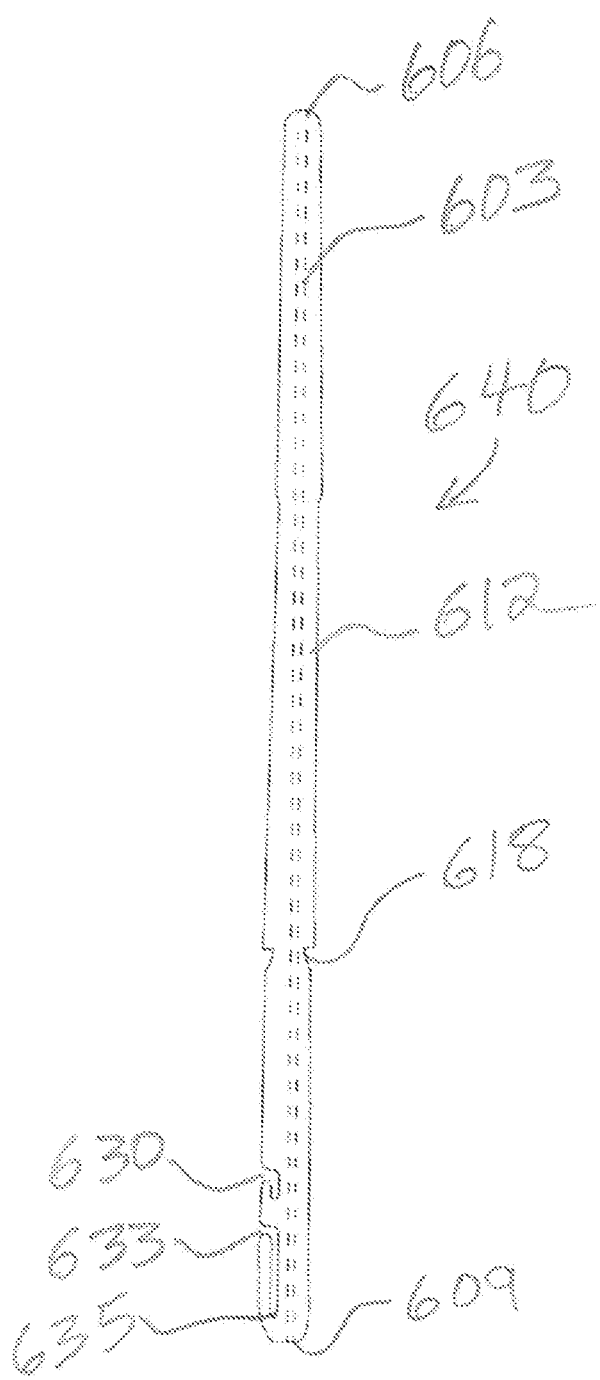
FIGS. 16a-b are front views of an assembled fishing float stem that includes a narrowed region for retaining a spring.
Figure 16B:
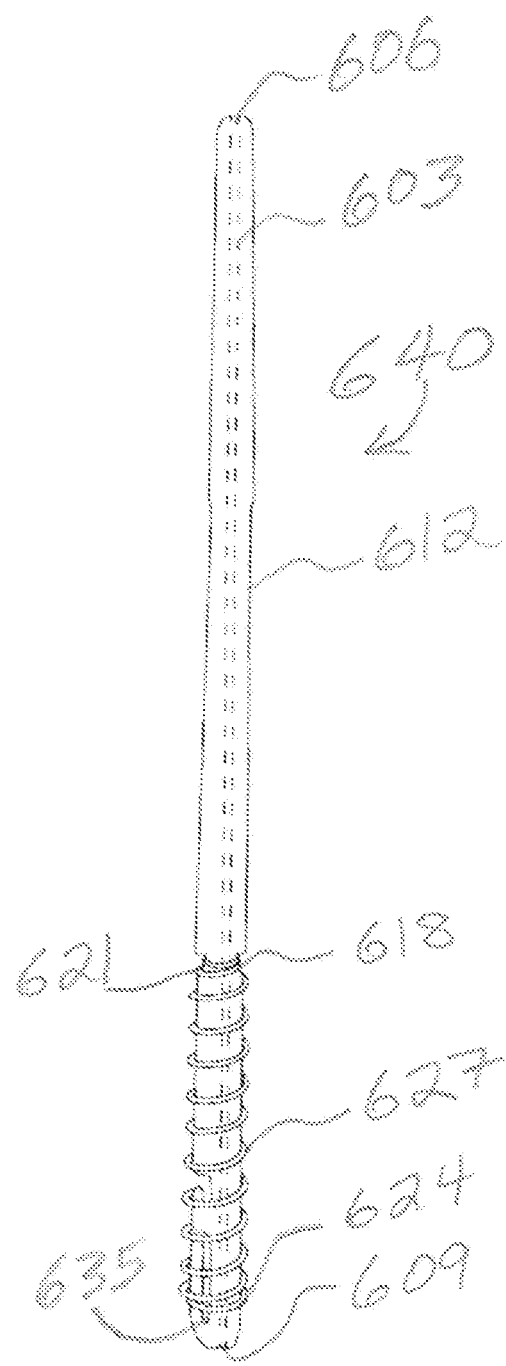

Referring to FIGS. 16a-b, which are a variation of the fishing float stem 600 disclosed in FIGS. 15a-b, the fishing float stem 640 differs by being formed without the use of the upper flange 615. Instead, the spring or sleeve is retained on the stem 640 using the narrowed region 618 of the stem. As illustrated in FIGS. 16a-b, the stem 650 includes the axial channel 603 that passes between the pair of open ends 606, 609. The narrowed region 618 has an outer diameter that is less than the outer diameter of the stem adjacent to the narrowed region 618. The spring has an end 621 that has a reduced inner diameter compared to the rest of the spring. The end 621 fits within the narrowed region 618, cannot be moved either up or down along the stem and thereby prevents removal of the spring from the stem. The spring also has the opposite end 624 that is of a larger diameter than the stem and can be moved up on the stem without displacing the end 621 of the spring.

The stem 640 also includes the pair of slots 630, 633 into which a fishing line can be placed for either fixed or slip fishing. In use, the spring is pushed upward from the opening 609 in the direction of the opening 606. By pushing the spring upward, one or both of the slots are exposed and a fishing line can be inserted into slot 630 for fixed fishing and slot 633 for slip fishing. As seen in FIG. 16b, the slot 633 includes a portion 635 that extends beyond the end 624 of the spring. In this manner, a fishing line can pass through the slot. Upon releasing the spring, the fishing line will be retained within the slot in the stem. The fishing line also can be inserted into opening 606 and passed through the axial channel 603 in the stem for slip fishing. In this manner, the stem is suitable for fixed fishing and two different configurations of slip fishing (i.e., through the center channel 603 and the lower slot 633).

Figures 17A, 17B:
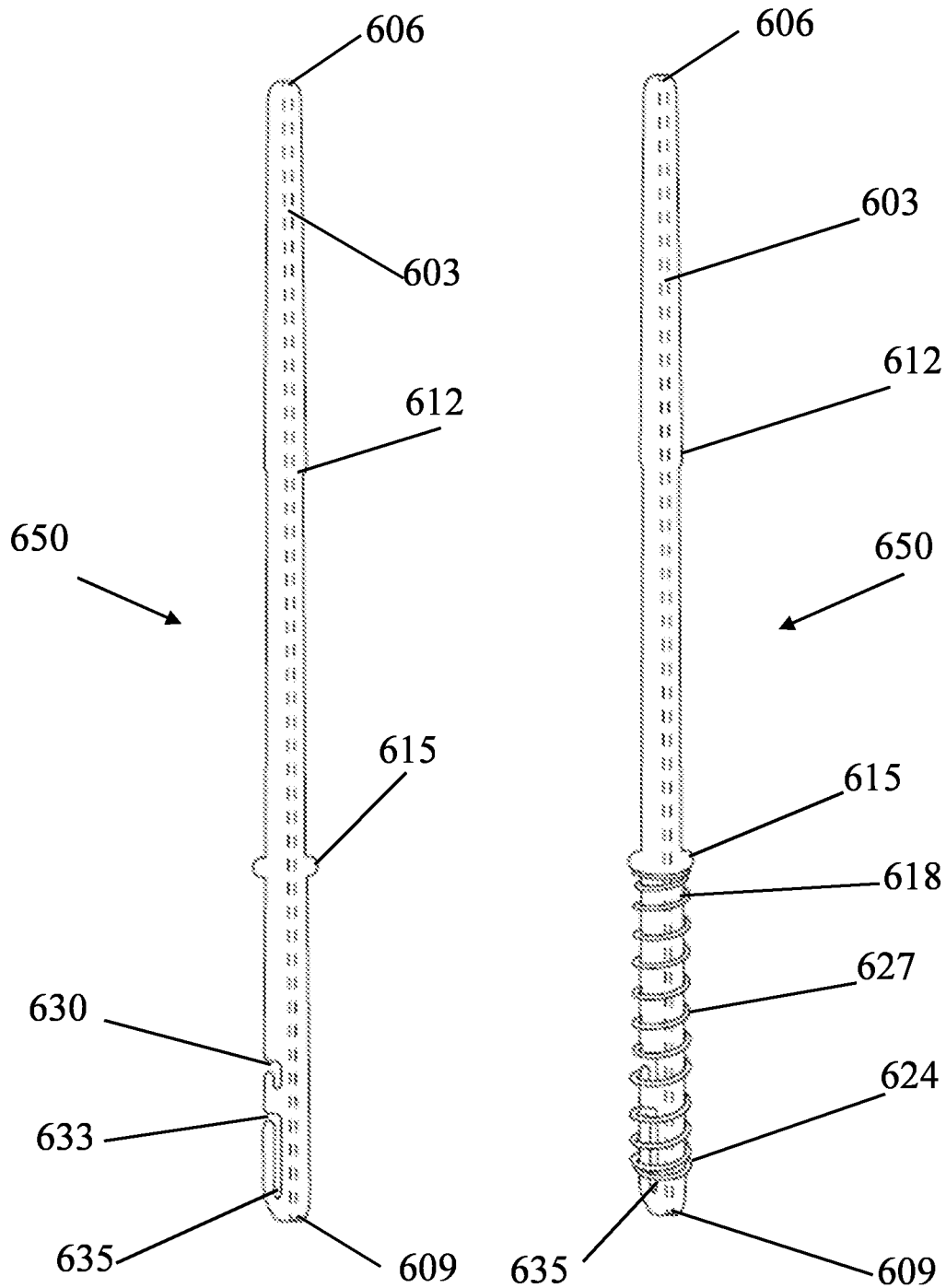
FIGS. 17a-b are front views of an assembled fishing float stem that includes a flange.

Referring to FIGS. 17a-b, which are a variation of the fishing float stem 600 disclosed in FIGS. 15a-b, the fishing float stem 650 differs by being formed with the use of the upper flange 615 but without the use of the narrowed region 621 of the stem. Rather than the spring or sleeve being retained on the stem 650 using a narrowed region of the stem, the end of the spring is retained on the stem using paint, glue or heat molding, or a combination of these. As illustrated in FIGS. 17a-b, the stem 650 includes the axial channel 603 that passes between the pair of open ends 606, 609. The flange 615 has an outer diameter that is greater than the outer diameter of the stem adjacent to the flange. In contrast to the spring in FIGS. 15a-b, the spring in FIGS. 17a-b has the end 618 end of a same inner diameter as the rest of the spring. The end 618 is painted, glued or heated molded, or a combination, or otherwise affixed onto the stem adjacent to the flange 615. In this manner, the entire spring cannot be moved either up or down along the stem and thereby prevents removal of the spring from the stem. However, through the combination of the flange and glue/heat molding, the opposite end 624 of the spring can be moved up on the stem without displacing the end 618 of the spring. The stem 650 also includes the pair of slots 630, 633 into which a fishing line can be placed for either fixed or slip fishing. In use, the spring is pushed upward from the opening 609 in the direction of the flange 615 and opening 606. By pushing the spring upward, one or both of the slots are exposed and a fishing line can be inserted into slot 630 for fixed fishing and slot 633 for slip fishing. Upon releasing the spring the fishing line will be retained within the slot in the stem. The fishing line also can be inserted into opening 606 and passed through the axial channel 603 in the stem for slip fishing. In this manner, the stem 650 is suitable for fixed fishing and two different configurations or modes of slip fishing (i.e., through the center channel 603 and the lower slot 633).

Referring to FIGS. 18a-b, which are a variation of the fishing float stem 600 disclosed in FIGS. 15a-b, the fishing float stem 660 differs by being formed without the use of either an upper flange, lower flange or bulbous region, or the narrowed region of the stem. Rather than the spring or sleeve being retained on the stem 650 using a narrowed region of the stem or movement upward on the stem being limited by a flange, the end 618 of the spring is retained on the stem using paint, glue or heat molding, or a combination of these. As illustrated in FIGS. 18a-b, the stem 650 includes the axial channel 603 that passes between the pair of open ends 606, 609. In contrast to the spring in FIGS. 16a-b, the spring in FIGS. 18a-b has an end 618 that is of the same inner diameter as the rest of the spring. The end 618 is painted, glued and/or heated molded onto the stem. In this manner, the entire spring cannot be moved either up or down along the stem and thereby prevents removal of the spring from the stem. By use of the glue/heat molding, the opposite end 624 of the spring can be moved up on the stem without displacing the end 618 of the spring.

The stem 660 also includes the pair of slots 630, 633 into which a fishing line can be placed for either fixed or slip fishing. In use, the spring is pushed upward from the opening 609 in the direction of the opening 606. By pushing the spring upward, one or both of the slots are exposed and a fishing line can be inserted into slot 630 for fixed fishing and slot 633 for slip fishing. Upon releasing the spring, the fishing line will be retained within the slot in the stem. The fishing line also can be inserted into opening 606 and passed through the axial channel 603 in the stem for slip fishing. In this manner, the stem 660 is suitable for fixed fishing and two different configurations of slip fishing (i.e., through the center channel 603 and the lower slot 633).

FIGS. 19a-b and 20a-b disclose different configurations in the lower portion of the fishing float stem of the slots for slip and fixed fishing. The stem portion 700 of FIGS. 19a-b includes a narrowed region 705 into which a narrowed end 707 of a spring 703 is positioned. The stem portion 700 includes a first slot portion 710, the second slot portion 712, the third slot portion 714 and the fourth slot portion 716. The spring or sleeve is positioned on the stem portion 700 with a lower end above and adjacent to the lower flange or bulbous end 718 and the end 707 at a narrowed region 705. The end 705 of the spring has a narrowed inner diameter compared to the rest of the spring such that the spring is held in place on the stem by the interaction between the narrowed region 705 of the stem and the narrowed inner diameter of the end 707. This interaction prevents movement of the entire spring during use. In use, the spring is pushed upward in a direction away from the lower flange 718 to expose the first slot portion 710 and the angler passes the fishing line into the first slot portion 710. The angler then can push the fishing line into the second slot portion 712 for slip fishing or into the third slot portion 714 for fixed fishing. Upon releasing the spring, if the fishing line is within the second slot portion 712, the fishing line will be moved into the fourth slot portion 716. With the fishing line in fourth slot portion 716, the fishing line will move through the slot for slip fishing. If the stem portion 700 has an axial channel along its length, the fishing line can be passed through the axial channel for slip fishing.

Figures 19A, 19B:
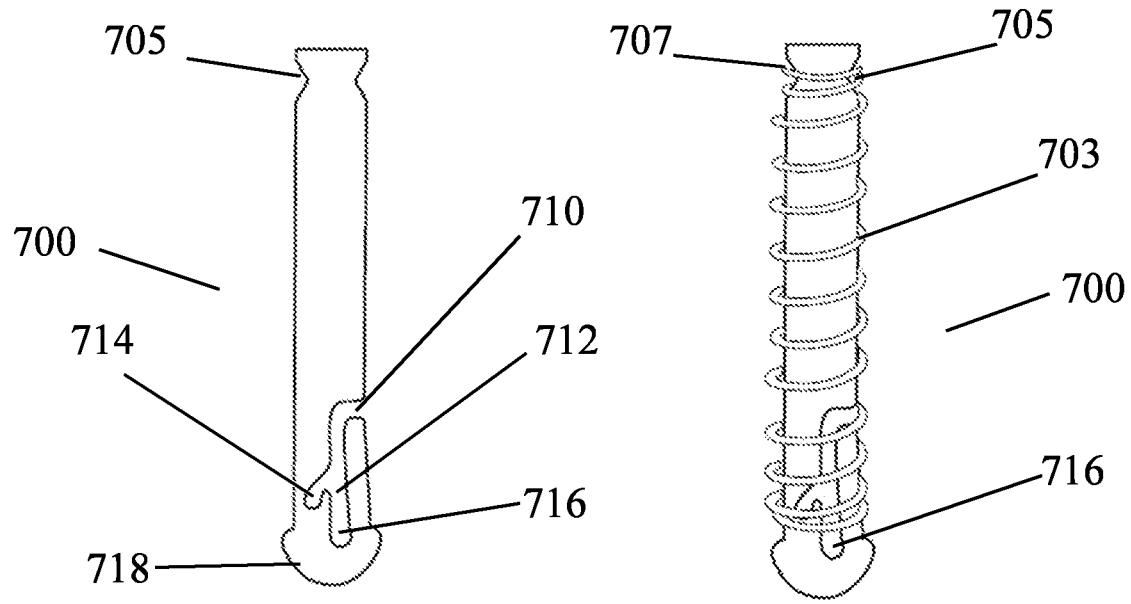
FIGS. 19a-b are front views of a portion of a fishing float stem that includes a narrowed region and a bulbous end for retaining a spring.
Figures 20A, 20B:
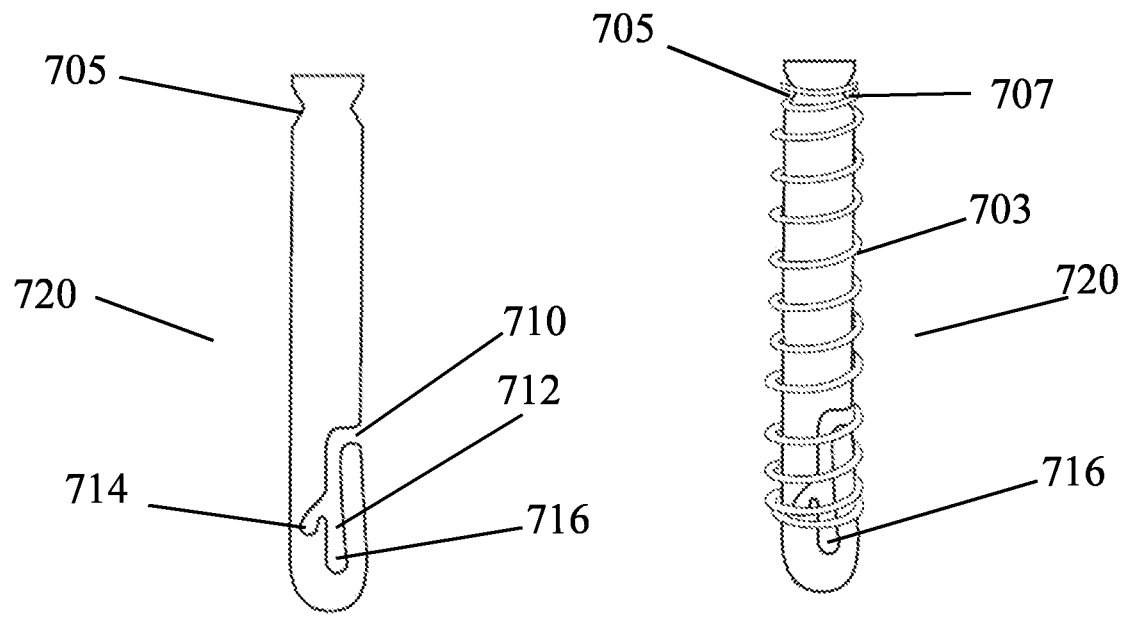
FIGS. 20a-b are front views of a portion of a fishing float stem that includes a narrowed region for retaining a spring.

FIGS. 20a-b illustrate a variation of the configuration illustrated in FIGS. 19a-b with a portion of a stem 720 illustrated. The stem 720 differs from the stem 700 by removal of or absence of the lower flange 718. The stem portion 720 includes the first slot portion or segment 710, the second slot portion or segment 712, the third slot portion 714 or segment and the fourth slot portion or segment 716. The spring or sleeve is positioned on the stem portion 720 with a lower end adjacent to the lower end of the stem and the end 707 of the spring within a narrowed region 705 of the stem in a location that would be in proximity to a float when a float is attached to the stem. The end 707 of the spring has a narrowed inner diameter compared to the rest of the spring such that the spring is held in place on the stem by the interaction between the narrowed region 705 of the stem and the narrowed inner diameter of the end 707. This interaction prevents movement of the entire spring during use. In use, the spring is pushed upward in a direction away from the lower end of the stem to expose the first slot portion 710 and the angler passes the fishing line into the first slot portion 710. The angler then can push the fishing line into the second slot portion 712 for slip fishing or into the third slot portion 714 for fixed fishing. Upon releasing the spring, if the fishing line is within the second slot portion 712, the fishing line will be moved into the fourth slot portion 716. With the fishing line in fourth slot portion 716, the fishing line will move through the slot for slip fishing. If the stem portion 720 has an axial channel along its length, the fishing line can be passed through the axial channel for slip fishing.

It should be understood from the about disclosure that the channel passing the length of the fishing float stem may have more than one diameter in the different segments or portions that make up the stem. For example, wherein a nipple of one piece is inserted into the channel in a second piece, the channel into which the nipple is inserted may have greater inner diameter for a length that is approximately the same as the length of the nipple. The inner diameter of the channel then may be reduced for all of the rest of the length of the channel in that segment or portion. For example, for the segment with the one or more slots, the channel may have an inner diameter of about 4.4 mm for about 8-10 mm and then narrow to an inner diameter of about 2 mm for a portion of the segment, and then be reduced further to about 1.2-1.5 mm, such as about 1.3 mm for the last portion of the segment. In particular, a narrowest inner diameter of the channel may be formed where the channel is adjacent to the one or more slots. Some of the challenges in developing the fishing float stem disclosed herein is injection molding a stem while in so doing maintaining an outer diameter acceptable to consumers while providing one or more slots and a channel running through the length of the fishing float stem. One problem encountered was the core pin breaking if the diameter of the channel and the length of the tube are not carefully controlled. One particular challenge was in the region of the stem in proximity of the slots where the stem needs to include a sufficient wall thickness, a channel and a slot across the diameter of the stem. Although in the past it was known to extrude a solid tube (i.e., without a channel) and cut slots into the tube, the slots cut in that manner were sharp and could cut the line. The inventor has determined that injection molding provides a better slot for receiving a fishing line with less potential to damage the fishing line.

For the upper segment of the fishing float stem, the dimensions of the inner channel may vary from 1 mm to 1.5 mm over the channel's length. The 1 mm diameter is typically found at the top of the tube where the fishing line enters the fishing float stem. The 1 mm diameter prevents a slip fishing knot and/or bead from enter the stem. The diameter of the channel then can be increased as the channel is further from the open end, for example to about 1.5 mm. Only a short segment of the channel needs to be of a smaller diameter because only a short segment is needed to prevent the knot or bead from entering the channel. The outer diameter of the upper segment can be of a lesser diameter, e.g., 4.4 to 6 mm, 4.4 to 5 mm, etc., because there are no slots in the wall that reduce the thickness of the wall.

It is not intended that the invention be limited, except as by the appended claims.

I claim:

1. A method of making a stem of a fishing float comprising:
using injection molding to form a first stem part having a cross section of a diameter of about 4.75 mm or greater and a length of between about 55 mm and about 70 mm, and comprising a first wall having an outer surface and an inner surface and a first wall surface connecting the outer surface to the inner surface with a thickness of the first wall defined as a distance from the outer surface to the inner surface, a first channel passing between an opening at a first end and an opening at a second end, a first slot passing from the outside surface of the first wall into the first wall without passing to the inner surface of the first wall, wherein the first stem part is injection molded as a single integral piece;
using injection molding to form a second stem part having a circular cross section of a diameter of about 5 mm or greater and a length between 55 mm and 70 mm, and consisting of a second wall having an outer surface and an inner surface and a second wall surface connecting the outer surface to the inner surface with a thickness of the second wall defined as a distance from the outer surface to the inner surface, a second channel passing between an opening at a first end and an opening at a second end, and further consisting of a first tubular member extending outwardly from the first end and having an outer diameter less than the outer diameter of the second stem part and approximately the same as the diameter of the first channel in the first stem part, wherein the second stem part is injection molded as a single integral piece; and inserting the first tubular member of the second stem part directly into the opening of the first channel at the second end of the first stem part to form a stem such that the first channel in the first stem part and the second channel in the second stem part align with a common longitudinal axis and a first joint is formed at the intersection of the first stem part and the second stem part, wherein the first stem part and the second stem part at the first joint each have a similar diameter, and whereby an assembled fishing float stem consists of the second stem part inserted into the first stem part.

2. The method of claim 1, wherein a majority of the length of a second channel in the assembled fishing float stem has a diameter of about 1.0 mm to about 3.2 mm.

3. The method of claim 2, wherein the first channel in the first stem part has a diameter of between about 1.3 and 1.5 mm when adjacent to the first slot.

4. The method of claim 1, wherein the outer diameter of the first stem part or the second stem part may be between about 4.4 mm and about 10 mm.

5. The method of claim 4, wherein the outer diameter of the first stem part has an outer diameter of between about 5.2 mm to about 5.5 mm when adjacent to the first slot.

6. The method of claim 1, further comprising mounting a buoyant member to the stem.

7. The method of claim 6, wherein the buoyant member has a third channel therethrough and mounting the buoyant member to the assembled fishing float stem comprises inserting the assembled fishing float stem into the third channel such that the float member surrounds the first joint.

8. The method of claim 1, wherein the first stem part and the second stem part are joined without the use of an adhesive between the first tubular member and the opening into the first channel in the first stem part.

9. The method of claim 5, further comprising using injection molding to form a cap part having a circular cross section of a diameter of at least about 4 mm and a length between 10 mm and 40 mm, and comprising a third wall having an outer surface and an inner surface and a third wall surface connecting the outer surface to the inner surface with a thickness of the third wall defined as a distance from the outer surface to the inner surface and being between 0.5 mm and 1.5 mm, a fourth channel having an opening at a first end and having a diameter of between 1.0 mm and 3.00 mm, and further comprising a second tubular member extending outwardly from the first end and having an outer diameter less than the outer diameter of the cap part and approximately the same as the diameter of the second channel in the second stem part; and inserting the second tubular member of the cap part into the opening into the second channel at the second end of the second stem part such that the fourth channel in the cap part and the second channel in the second stem part align with a common longitudinal axis and a second joint is formed at the intersection of the cap part and the second stem part.

10. The method of claim 9, wherein the cap part and the second stem part are joined without the use of an adhesive between the second tubular member and the opening into the second channel in the second stem part.

11. The method of claim 1, further comprising mounting a spring to the assembled fishing float stem.

12. The method of claim 1, further comprising a second slot passing from the outside surface of the first wall into the first wall without passing to the inner surface of the first wall, wherein the second slot passes from the outer surface of the first wall into the first wall at a different position along the length of the first stem part than the first slot.

13. The method of claim 1, wherein the first stem part and the second stem part are injection molded without the use of a bridge pin.

14. The method of claim 1, wherein the first stem part and the second stem part are injection molded with a single core pin.

* * * * *